US011353226B2

(12) United States Patent
Park et al.

(10) Patent No.: US 11,353,226 B2
(45) Date of Patent: Jun. 7, 2022

(54) AIR-CONDITIONER BASED ON PARAMETER LEARNING USING ARTIFICIAL INTELLIGENCE, CLOUD SERVER, AND METHOD OF OPERATING AND CONTROLLING THEREOF

(71) Applicant: LG ELECTRONICS INC., Seoul (KR)

(72) Inventors: Yun Sik Park, Seoul (KR); Young Tag Kwon, Seoul (KR); Dongwoo Han, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 16/380,480

(22) Filed: Apr. 10, 2019

(65) Prior Publication Data

US 2019/0309970 A1    Oct. 10, 2019

(30) Foreign Application Priority Data

Apr. 10, 2018  (KR) .......................... 10-2018-0041550

(51) Int. Cl.
*G05B 13/02* (2006.01)
*F24F 120/12* (2018.01)
(Continued)

(52) U.S. Cl.
CPC ................ *F24F 11/30* (2018.01); *F24F 1/06* (2013.01); *F24F 11/0008* (2013.01);
(Continued)

(58) Field of Classification Search
CPC ............................... G05B 13/027; F24F 11/00
See application file for complete search history.

(56) References Cited

U.S. PATENT DOCUMENTS 5,442,926 A * 8/1995 Kawai ...................... F24F 11/30
62/211
5,560,422 A * 10/1996 Matumoto .......... G05D 23/1917
165/259
(Continued)

FOREIGN PATENT DOCUMENTS

CN        103162375 A  *  6/2013
CN        105757901        7/2016
(Continued)

OTHER PUBLICATIONS

Machine Translation for KR-101333661-B1, obtained Jul. 2020 (Year: 2020).*

(Continued)

*Primary Examiner* — Jennifer L Norton
(74) *Attorney, Agent, or Firm* — Fish & Richardson P.C.

(57) ABSTRACT

An air conditioner includes: an indoor unit including a blowing unit to discharge air; an outdoor unit supplying compressed refrigerant to the indoor unit, to exchange heat with the air before discharge. The air conditioner also includes at least one computer memory operably connectable to at least one processor and storing instructions that, when executed, perform operations that include: generating at least one parameter in a first operation mode, which is operated only within a preset time range; controlling, based on an operation mode information, at least one of (i) the blowing unit to change a wind direction and an air volume, or (ii) the outdoor unit; and switching to a second operation mode after a time period of operation in the first operation mode. The operation mode information includes at least one result factor obtained from at least one machine-learning network.

18 Claims, 16 Drawing Sheets

(51) Int. Cl.
| | |
|---|---|
| *F24F 110/10* | (2018.01) |
| *F24F 11/00* | (2018.01) |
| *F24F 11/64* | (2018.01) |
| *F24F 11/79* | (2018.01) |
| *F24F 11/80* | (2018.01) |
| *G06N 3/04* | (2006.01) |
| *F24F 11/86* | (2018.01) |
| *F24F 1/06* | (2011.01) |
| *F24F 11/30* | (2018.01) |
| *F24F 11/56* | (2018.01) |
| *F24F 11/58* | (2018.01) |
| *F24F 11/61* | (2018.01) |
| *F24F 11/65* | (2018.01) |
| *F24F 11/77* | (2018.01) |
| *F24F 110/20* | (2018.01) |

(52) U.S. Cl.
CPC ............. *F24F 11/56* (2018.01); *F24F 11/58* (2018.01); *F24F 11/61* (2018.01); *F24F 11/64* (2018.01); *F24F 11/65* (2018.01); *F24F 11/77* (2018.01); *F24F 11/79* (2018.01); *F24F 11/80* (2018.01); *F24F 11/86* (2018.01); *G05B 13/027* (2013.01); *G06N 3/04* (2013.01); *F24F 2110/10* (2018.01); *F24F 2110/20* (2018.01); *F24F 2120/12* (2018.01)

(56) References Cited

U.S. PATENT DOCUMENTS

| | | | | |
|---|---|---|---|---|
| 2001/0000407 | A1* | 4/2001 | Ichishi | B60H 1/00814 236/13 |
| 2008/0191045 | A1* | 8/2008 | Harter | G05D 23/1904 236/91 D |
| 2010/0318227 | A1 | 12/2010 | Steinberg et al. | |
| 2011/0056673 | A1* | 3/2011 | Jang | F24F 11/62 165/201 |
| 2011/0231019 | A1* | 9/2011 | Nanami | G05B 19/042 700/277 |
| 2013/0284818 | A1* | 10/2013 | Hayashida | G05D 23/1923 237/56 |
| 2014/0319231 | A1* | 10/2014 | Matsuoka | G05D 23/1902 236/51 |
| 2016/0072638 | A1* | 3/2016 | Amer | F24F 11/30 398/106 |
| 2016/0161137 | A1* | 6/2016 | Chen | F24F 11/30 700/276 |
| 2016/0252266 | A1* | 9/2016 | Ushirosako | G05B 15/02 700/278 |
| 2016/0321564 | A1 | 11/2016 | Imahara et al. | |
| 2017/0314799 | A1* | 11/2017 | LeRoy | F24F 11/30 |
| 2018/0142914 | A1* | 5/2018 | Seo | F24F 11/64 |
| 2018/0195752 | A1* | 7/2018 | Sasaki | F24F 11/61 |
| 2018/0283723 | A1* | 10/2018 | Ock | G05B 15/02 |
| 2019/0309978 | A1* | 10/2019 | Song | F24F 11/56 |
| 2021/0018209 | A1* | 1/2021 | Ellis | G05B 13/041 |
| 2021/0041121 | A1* | 2/2021 | Park | G06N 20/00 |

FOREIGN PATENT DOCUMENTS

| | | | |
|---|---|---|---|
| CN | 107355946 | | 11/2017 |
| CN | 107504656 | | 12/2017 |
| CN | 108361927 A | * | 8/2018 |
| CN | 108278732 B | * | 12/2019 |
| EP | 2484986 | | 8/2012 |
| JP | 2522102 | | 8/1996 |
| JP | 2611051 B2 | * | 5/1997 |
| JP | 2016042016 | | 3/2016 |
| KR | 1020030030413 | | 4/2003 |
| KR | 20120079119 | | 7/2012 |
| KR | 101333661 B1 | * | 11/2013 |
| KR | 1020150125343 | | 11/2015 |
| KR | 101611738 | | 4/2016 |
| KR | 101824324 | | 3/2018 |
| KR | 20190019737 | | 2/2019 |
| KR | 1020190019737 | | 2/2019 |
| WO | 2016/186417 | | 11/2016 |
| WO | WO2010074429 | | 7/2017 |
| WO | WO2018047343 | | 3/2018 |
| WO | WO-2020035910 A1 | * | 2/2020 ............. F24F 11/65 |

OTHER PUBLICATIONS

Machine Translation for CN-108361927-A, obtained Jul. 2020 (Year: 2020).*
Machine Translation for CN-108278732-B, obtained Jul. 2020 (Year: 2020).*
Machine Translation for CN-103162375-A, obtained Dec. 2020 (Year: 2020).*
Machine Translation for JP-2611051-B2, obtained Mar. 2021 (Year: 2021).*
Extended European Search Report in European Application No. 19167887.9, dated Aug. 22, 2019, 9 pages.
Chinese Office Action in Chinese Appln. No. 201910284184.1, dated Sep. 28, 2020, 9 pages (with English translation).

* cited by examiner

AIR-CONDITIONER BASED ON PARAMETER LEARNING USING ARTIFICIAL INTELLIGENCE, CLOUD SERVER, AND METHOD OF OPERATING AND CONTROLLING THEREOF

CROSS-REFERENCE TO RELATED APPLICATIONS

This application claims priority under 35 U.S.C. § 119 to Korean Application No. 10-2018-0041550, filed on Apr. 10, 2018, the entire disclosure of which is herein incorporated by reference.

TECHNICAL FIELD

The present disclosure generally relates to an air conditioner that operates based on parameter learning.

BACKGROUND

An air conditioner is typically configured to provide a comfortable indoor environment to humans by discharging cold and warm air to an interior to adjust an indoor temperature and by purifying indoor air.

SUMMARY

One general aspect of the present disclosure includes an air conditioner, including: an indoor unit including a blowing unit configured to discharge air. The air conditioner also includes an outdoor unit configured to supply compressed refrigerant to the indoor unit, such that the supplied refrigerant exchanges heat with the air before the air is discharged from the blowing unit. The air conditioner also includes at least one processor; and at least one computer memory operably connectable to the at least one processor and storing instructions that, when executed by the at least one processor, perform operations including: generating at least one parameter in a first operation mode of the air conditioner, where the first operation mode is operated only within a preset time range. The operations also include controlling, based on an operation mode information, at least one of (i) the blowing unit of the indoor unit to change a wind direction and an air volume of the discharged air, or (ii) the outdoor unit, where the operation mode information includes at least one result factor that is Obtained from at least one machine-learning network. The operations also include performing an operation of switching to a second operation mode after a time period of operation in the first operation mode. An absolute value of a first temperature change rate during the first operation mode is greater than an absolute value of a second temperature change rate during the second operation mode. Other embodiments of this aspect include corresponding computer systems, apparatus, and computer programs recorded on one or more computer storage devices, each configured to perform the actions of the methods.

Implementations may include one or more of the following features. The air conditioner further including a communication unit configured to communicate with a cloud server, where the operations may also include where the at least one result factor obtained from the at least one machine-learning network is obtained from at least one of (i) the cloud server after the communication unit transmits the at least one parameter to the cloud server, or (ii) an embedded learning unit. The air conditioner where the operations further include: based on the air conditioner operating for cooling, maintaining a temperature during a first period from a time point when the first operation mode ends, and subsequently increasing the temperature compared to the temperature of the first period during a second period; and based on the air conditioner operating for heating, maintaining a temperature during a first period from a time point when the first operation mode ends, and subsequently reducing the temperature compared to the temperature of the first period during a second period, where the first period and the second period form a time interval of the second operation mode: The air conditioner where the operations further include: receiving, through an interface unit, a control signal related to an increase or a decrease in a temperature of the air conditioner, where, based on the air conditioner operating for cooling in the second operation mode, increasing or decreasing a length of the first period or the second period in inverse proportion to the increase or the decrease of the temperature by the control signal. The air conditioner where the operations further include: based on a difference between a current temperature and a target set temperature being within a temperature band, or based on the difference being maintained for a time period in the second operation mode, performing an operation to switch to the first operation mode. The air conditioner where the operations further include: performing a humidity control operation mode based on a humidity level, which is sensed at a time of switching from the first operation mode to the second operation mode, exceeding a first reference threshold criteria; and releasing the humidity control operation mode based on the humidity level reaching a second reference threshold criteria and being maintained for a period of time. The air conditioner where the operations further include: storing position information related to a residing area, based on an occupant repeatedly being detected in a space where the air conditioner is installed; and setting a left/right wind direction of the blowing unit in the first operation mode to be directed to the residing area. The air conditioner where the operations further include: storing position information related to an activity area that includes the residing area, based on the occupant being intermittently detected; and setting the left/right wind direction of the blowing unit in the second operation mode to the activity area. The air conditioner where the operations further include: based on (i) the air conditioner starting to operate and the difference between a current indoor temperature and a target set temperature being greater than a predefined value, or (ii) the air conditioner receiving an input signal that instructs a driving of the first operation mode: performing an operation of switching to the first operation mode: The air conditioner where the at least one parameter includes: (i) an indoor initial temperature related to a time at which the first operation mode is started, (ii) a target set temperature for the first operation mode, (iii) a first temperature change rate during an initial time interval of the first operation mode, (iv) a second temperature change rate during the first operation mode, and (v) a time difference between a start time and an end time of the first operation mode. The air conditioner where the at least one machine-learning network includes: at least one input layer that has the at least one parameter as at least one input node; at least one output layer that has the operation mode information as at least one output node; and at least one hidden layer arranged between the at least one input layer and the at least one output layer, where weights of at least one node and at least one edge between the at least one input node and the at least one output node are updated by a learning process of the at least one machine-learning network. Implementations of the described techniques may include hardware, a method or process, or computer software on a computer-accessible medium.

Another general aspect includes a method of controlling an air conditioner based on machine-learning, the air conditioner including (i) an indoor unit having a blowing unit configured to discharge air, and (ii) an outdoor unit configured to supply compressed refrigerant to the indoor unit, the method including: operating the blowing unit to discharge air in a first operation mode of the air conditioner within a preset time range, where the first operation mode is operated only within a preset time range. The method also includes generating at least one parameter in the first operation mode of the air conditioner. The method also includes controlling, based on an operation mode information, at least one of (i) the blowing unit of the indoor unit to change a wind direction and an air volume of the discharged air, or (ii) the outdoor unit, where the operation mode information includes at least one result factor that is obtained from at least one machine-learning network. The method also includes performing an operation of switching to a second operation mode after a time period of operation in the first operation mode. The method also includes where an absolute value of a first temperature change rate during the first operation mode is greater than an absolute value of a second temperature change rate during the second operation mode. Other embodiments of this aspect include corresponding computer systems, apparatus, and computer programs recorded on one or more computer storage devices, each configured to perform the actions of the methods.

Implementations may include one or more of the following features. The method further including: based on the air conditioner operating for cooling, maintaining a temperature during a first period from a time point when the first operation mode ends, and subsequently increasing the temperature compared to the temperature of the first period during a second period; and based on the air conditioner operating for heating, maintaining a temperature during a first period from a time point when the first operation mode ends, and subsequently reducing the temperature compared to the temperature of the first period during a second period, where the first period and the second period form a time interval of the second operation mode. The method where the at least one parameter includes (i) an indoor initial temperature related to a time at which the first operation mode is started, (ii) a target set temperature for the first operation mode, (iii) a first temperature change rate during an initial time interval of the first operation mode, (iv) a second temperature change rate during the first operation mode, and (v) a time difference between a start time and an end time of the first operation mode. The method further including: based on a difference between a current temperature and a target set temperature being within a temperature band, or based on the difference being maintained for a time period in the second operation mode, performing an operation to switch to the first operation mode. The method further including: performing a humidity control operation mode based on a humidity level, which is sensed at a time of switching from the first operation mode to the second operation mode, exceeding a first reference threshold criteria; and releasing the humidity control operation mode based on the humidity level reaching a second reference threshold criteria and being maintained for a period of time. Implementations of the described techniques may include hardware, a method or process, or computer software on a computer-accessible medium.

Another general aspect includes a cloud server, including: a communication unit configured to communicate with a plurality of air conditioners. The cloud server also includes at least one processor; and at least one computer memory operably connectable to the at least one processor and storing instructions that, when executed by the at least one processor, perform operations including: receiving, from each of the plurality of air conditioners, at least one parameter generated in a first operation mode of respective air conditioner, where the at least one parameter is related to at least one temperature individually set in the respective air conditioner. The operations also include, for each of the plurality of air conditioners, using at least one machine-learning network to process the at least one parameter received from the respective air conditioner, and generating, through a learning process, operation mode information for the respective air conditioner. The operations also include transmitting, to each of the plurality of air conditioners, the operation mode information for the respective air conditioner, where the operation mode information includes data to set a second operation mode of the respective air conditioner after a period of time of operating the first operation mode. An absolute value of a first temperature change rate during the first operation mode is greater than an absolute value of a second temperature change rate during the second operation mode of the respective air conditioner. Other embodiments of this aspect include corresponding computer systems, apparatus, and computer programs recorded on one or more computer storage devices, each configured to perform the actions of the methods.

Implementations may include one or more of the following features. The cloud server where, for each of the plurality of air conditioners, the at least one parameter includes (i) an indoor initial temperature related to a time at which the first operation mode is started for the respective air conditioner, (ii) a target set temperature for the first operation mode of the respective air conditioner, (iii) a first temperature change rate during an initial time interval of the first operation mode of the respective air conditioner, (iv) a second temperature change rate during the first operation mode of the respective air conditioner, and (v) a time difference between a start time and an end time of the first operation mode of the respective air conditioner. The cloud server where the at least one machine-learning network includes: at least one input layer that has the at least one parameter as at least one input node; at least one output layer that has the operation mode information as at least one output node; and at least one hidden layer arranged between the at least one input layer and the at least one output layer, where weights of at least one node and at least one edge of the at least one input node and the at least one output node are updated by a learning process of the at least one machine-learning network.

Implementations of the described techniques may include hardware, a method or process, or computer software on a computer-accessible medium.

All or part of the features described throughout this disclosure can be implemented as a computer program product including instructions that are stored on one or more non-transitory machine-readable storage media, and that are executable on one or more processing devices. All or part of the features described throughout this disclosure can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Technologies for controlling air conditioners to be suitable for temperatures preferred by users and for controlling air conditioners for user convenience have been developed. In the present disclosure, a mechanism in which an air conditioner operates in a rapid mode and a comfortable mode will be described in FIG. 1 in more detail.

Figure 1:
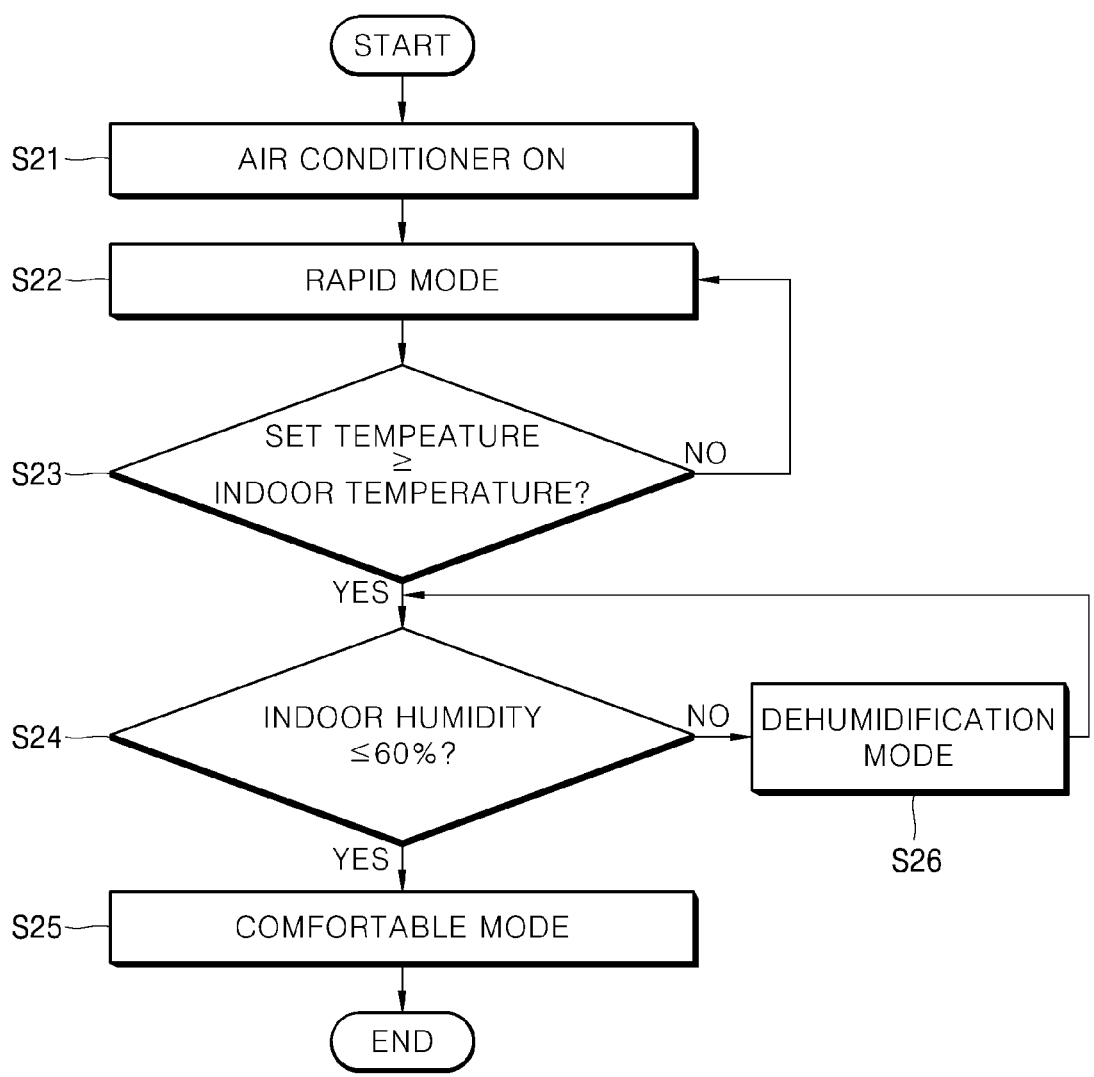
FIG. 1 shows an operation process of an air conditioner operating in a rapid mode and a comfortable mode.

FIG. 1 shows an operation process of an air conditioner operating in a rapid mode and a comfortable mode. When the air conditioner is turned on (S21), the air conditioner is operated in a rapid mode (a rapid operation period or a rapid period means a period during which a rapid mode is performed) according to a predetermined set temperature Ts (S22). A set temperature Ts may be selected by the user or may be automatically set according to a predetermined condition. The rapid mode is a configuration that rapidly cools (or heats) a space. Then, in the rapid mode, the air conditioner is operated with a maximum cooling capacity to quickly cool (or heat) an indoor space. In this process, when a set temperature and an indoor temperature are compared to each other (S23), and a temperature reaches the set temperature, indoor humidity is confirmed (S24). When the indoor humidity is equal to or greater than a predetermined numerical value, the air conditioner operates in a dehumidification mode (S26). On the other hand, when the indoor humidity is equal or less than a predetermined numerical value, the air conditioner operates in a comfortable mode (S25).

Here, the comfortable mode (a comfortable operation period or a comfortable period means a period during which the comfortable mode is performed) means the operating with a new set temperature Tsa which is higher than the set temperature Ts. It includes an operation of a power saving function that maintains comfortable cooling (or heating) by sensing an environment and adjusting a cooling operation output. The air conditioner operates in the rapid mode at first when the air conditioner is turned on. Then, when the temperature of the target space reaches a predetermined temperature, the operation of switching to the comfortable mode is provided.

However, in some scenarios, the comfortable mode and the rapid mode may have a limitation in that a change of surrounding environment conditions cannot be dynamically reflected in the operation of the modes. For example, parameters that affect an operation of the rapid mode and the comfortable mode and their values may vary depending on changes in external temperature, the number of residing people, or humidity, and the like. As such, there may be limitations that these parameters are not fully considered in performing the rapid mode and the comfortable mode.

Generally, an air conditioner includes an indoor unit installed in an indoor environment, and an outdoor unit including a compressor, and a heat exchanger, and the like, to supply the refrigerant to the indoor unit.

In some scenarios, the indoor unit and the outdoor unit of an air conditioner can be controlled separately. Further, at least one indoor unit may be connected to the outdoor unit, and the air conditioner is operated in a cooling or heating mode by supplying a refrigerant to the at least one indoor unit depending on a requested operation state.

In some systems, an indoor unit of air conditioner is fixedly arranged in a specific space and operated, and techniques for improving a performance of the air conditioner may be implemented by collecting operation information provided from a plurality of indoor units. According to some implementations of the present disclosure, techniques for controlling each of the indoor units to operate optimally in various operation modes by using operation information provided from the plurality of indoor units, and an air conditioner applying such techniques will be described.

Implementations disclosed herein can help address the above-mentioned problems. According to some implementations, a learning-based apparatus and technique are provided for efficiently operating in a period divided into two or more operation modes of an air conditioner based on the parameters generated in an operating period of an air conditioner.

Implementations described herein enable determining an appropriate (e.g., an optimum) operation mode of the air conditioner by having the parameter generated by an indoor unit of the plurality of air conditioners as a learning factor.

Implementations described herein enable controlling an operation of a subsequent step based on the parameter generated in a process of rapidly changing a temperature during the operation of the indoor unit.

In the present disclosure, the components that form an air conditioner may be classified into an outdoor unit and an indoor unit. An air conditioning; system may be made of one or more outdoor units and one or more indoor units. The relationship between the outdoor unit and the indoor unit may be 1:1, 1:N, or M:1.

In some scenarios, when the implementations of the present disclosure are applied, the air conditioner can have the one or more parameters generated in an operation process as learning factors and determine the operation mode with respect to the learning factor.

In some scenarios, when the implementations of the present disclosure are applied, the cloud server can determine the operation mode suitable for each air conditioner after performing a learning process based on the parameters generated during the operation of the plurality of air conditioners.

In some scenarios, when an implementation of the present disclosure is applied, after the air conditioner is operated to reach a predetermined target temperature, it is possible to maintain the target temperature within a predetermined range based on a small amount of electrical power consumption per unit time.

In some scenarios, when an implementation of the present disclosure is applied, it is possible to provide a method of estimating a learning-based operation load for an efficient control of cooling or heating of an air conditioner and an apparatus applying such method.

The effects of the present disclosure are not limited to the effects described above, and those skilled in the art of the present disclosure can easily understand various effects of the present disclosure based on the disclosure of the present disclosure.

The present disclosure can be applied to all apparatuses that control cooling or heating. However, for convenience of explanation, the cooling will be mainly described. When the present disclosure is applied to the heating, it is possible to apply the implementations of the present disclosure to a process of raising a temperature and a mechanism that maintains a raised temperature.

Figure 2:
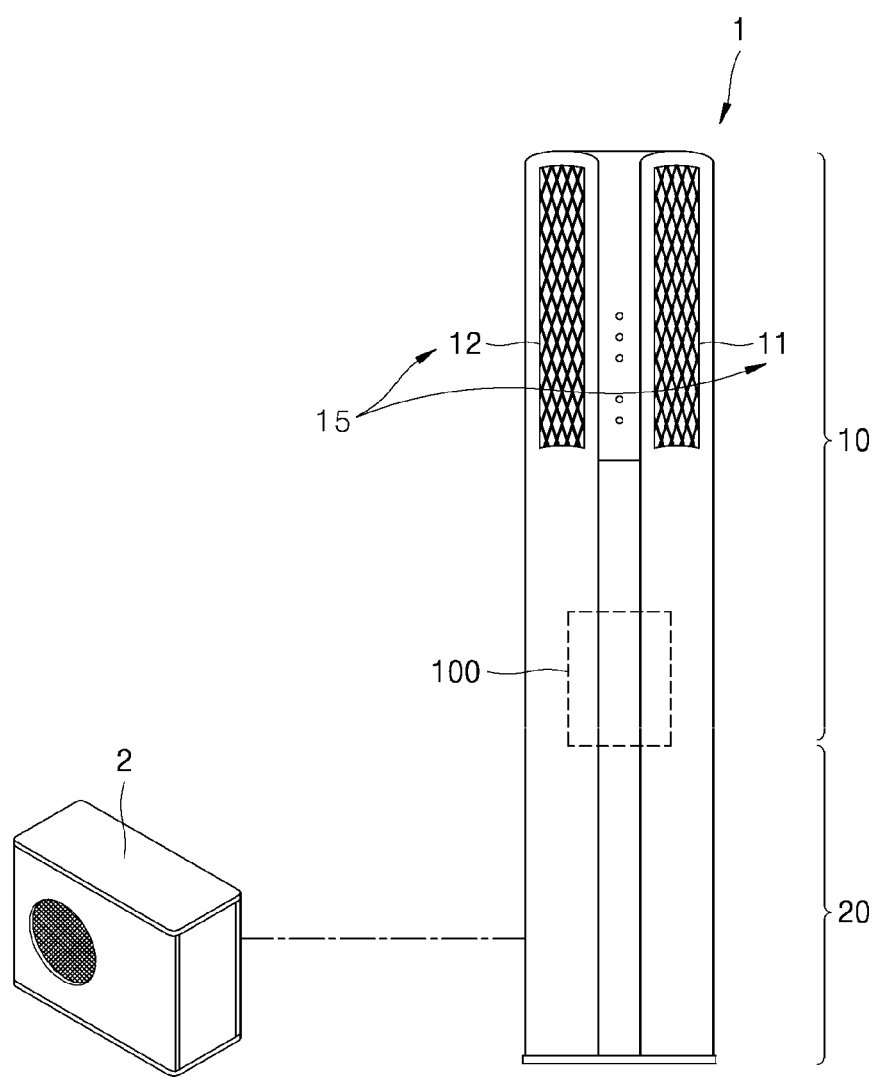
FIG. 2 is a front view of a configuration of an indoor unit of an air conditioner according to an implementation of the present disclosure.

FIG. 2 is a front view of a configuration of an indoor unit of an air conditioner according to an implementation of the present disclosure.

An indoor unit of an air conditioner may be a ceiling-installed embedded type or a stand type. Alternatively, the indoor unit of the air conditioner may be a wall-mounted type installed on a wall or may be a movable form. FIG. 2 shows a stand type indoor unit 1 in various implementations, but the present disclosure is not limited thereto. The indoor unit 1 may be connected to an outdoor unit 2 arranged in a space separate from another space where the indoor unit 1 is arranged.

The air conditioner may be the stand type that stands on the floor in the indoor and is installed, which is a subject of an air conditioning. In this case, the air conditioner may further include a base 20 that is placed on the floor in the indoor to support an air conditioning module 10.

The air conditioning module 10 may be installed in a form placed on the base 20. In this case, the air conditioning module 10 can suck air at the predetermined height of the indoor to do the air-conditioning.

The air conditioning module 10 may be detachably coupled to the base 20 or may be integrally formed with the base 20.

The air conditioning module 10 may discharge air from a blowing unit 15. The blowing unit 15 may be divided for blowing left and right direction as 11 and 12. The air conditioning module 10 can concentrically discharge air to a front surface. Further, according to the implementation, the air conditioning module 10 can discharge the air from a blowing unit arranged in various directions such as a side surface or an upper surface, and the like. The blowing unit 15 can control a wind speed by the operation mode control units 190 and 290, which will be described later. In one implementation, the blowing unit 15 can discharge wind of the wind speed including a plurality of steps. For this purpose, one or more individual blowing fans can be controlled.

On the other hand, suction units that suck indoor air can be arranged in the air conditioning module 10. Further, it is not identified from the outside, but the control module 100 that controls the indoor unit 1 can be arranged in the indoor unit 1. For convenience of explanation, the indoor unit 1 is arranged inside of the inside unit 1 with a dashed line in FIG. 2.

The outdoor unit 2 contributes to control a temperature of air (wind) discharged by the blowing unit 15. In one implementation, a compressor of the outdoor unit 2 may compress and discharge a gaseous refrigerant into a high-temperature and high-pressure state to provide cooling air to the indoor unit 1. In addition, when the present disclosure is applied to the heating, the outdoor unit 2 can provide heating air to the indoor unit 1 by using a predetermined heat pump. The manner in which the outdoor unit 2 provides the cooling or heating air using compressed refrigerant or heat pump to the indoor unit 1 may be variously provided and the present disclosure is not limited thereto.

The indoor unit 1 exemplarily shown in FIG. 2 measures a state of the indoor air and operates to reach a set state. However, in order for an operation of the indoor unit to effectively proceed during a process of reaching a specific state, various elements should be considered before or after reaching that specific state. When the operation of the indoor unit is controlled more precisely by using a learning model based on each of the elements, an efficient operation is possible.

Hereinafter, in the present disclosure, in the first implementation, the control module 100 may be arranged in the indoor unit 1 to generate various parameters and perform learning based on the generated various parameters. Then, a configuration in which the control module 100 arranged in the indoor unit 1 determines an operation mode suitable for the indoor unit based on a learned result will be described. The configuration is referred to as an 'internal learning based control module'. In the implementation, in the inner learning base, the air conditioner is operated by inputting the parameter into an embedded learning unit 160 and using the operation mode information, which is a calculated result factor, in some implementations.

Further, in the present disclosure, in the second implementation, the control module 100 is arranged in the indoor unit 1 to calculate various parameters, and provides the calculated result to a cloud server. The cloud server performs the learning based on the parameter that various indoor units transmit. Then, a configuration in which the cloud server determines the operation mode suitable for the indoor unit based on the learned result will be described. The configuration is referred to as an "external learning based control module". In one implementation, in the external learning base, the air conditioner is operated by using the operation mode information, which is a result factor transmitted from the cloud server, after the air conditioner transmits the parameter to the external cloud server.

Further, in the present disclosure, a first period means a period for which an air conditioner operates with a first cooling capability (in a case of heating, a first heating capability), in response to a set temperature (a target temperature set by the user). A second period means a period for which the air conditioner operates with a second cooling capability (in a case of heating, a first heating capability) different from the first cooling capability after the first period. Accordingly, when the user operates an air conditioner at a specific time point or instructs a smart care, the air conditioner may operate with a first cooling capability (for example, the maximum cooling capability) in response to the set temperature. The configuration may be referred to as a rapid operation mode (or for convenience of explanation, as an abbreviation, a rapid mode). The rapid operation mode can be only operated within a preset time range. After the time range, the air conditioner operates in a comfortable operation mode, and information needed for a detailed operation in the comfortable operation mode is operation mode information.

The rapid operation mode can start when the air conditioner starts to operate and a difference between a room temperature and a target set temperature is greater than a predefined value. Alternatively, when the air conditioner receives an input signal that instructs the driving of the rapid operation mode, the air conditioner can operate in response to the received input signal. For example, when the user does not control a temperature additionally by using a remote controller but presses a button that instructs the operation artificially intelligently or instructs the operation body-adaptively, the air conditioner executes the rapid operation mode in response to the pressed button. The air conditioner switches the operation mode to the comfortable operation mode, which will be described later, without an additional user control.

After the temperature of the air conditioner reaches the set temperature or the maximum time allocated to the rapid mode has elapsed, the parameter generated in the operation in the rapid mode as described above may be inputted as a learning factor, and the air conditioner is operated with the second cooling capability (for example, cooling operation output for an overload, a standard load, or a small load) different from the first cooling capability. The operation mode may be referred to as a comfortable operation mode (alternatively, for convenience of explanation, as an abbreviation, referred to as a comfortable mode). The above-mentioned second cooling capability (cooling operation output for the overload, the standard load, the small load) corresponds to a load of a space where the air conditioner is installed, and the second cooling capability can be determined based on the operation mode information.

In one implementation, at the overload mode, air volume or a wind speed is increased. Further, in one implementation, at the small load mode, air volume or a wind speed is decreased. Also, in one implementation, at the standard load mode, air volume or a wind speed may be maintained.

In the first cooling capability, the air conditioner operates according to the maximum cooling (or heating) capability to provide the user with a function of the cooling (or the heating), and then use less energy when it reaches a certain level (or time). Alternatively, in the first cooling capability, the air conditioner can operate by using a large amount of energy to decrease a temperature up to a comfortable level. During the operation according to the second cooling capacity, a temperature of air discharged from the air conditioner can be gradually increased. As the heating is the opposite case to the cooling, the temperature can be gradually decreased during the operation according to a second heating capacity.

When the user selects a specific function, for example, a smart care, or simply push a power-on button on a controller to operate the air conditioner first, the air conditioner performs the rapid operation during an initial predetermined period, and then, the air conditioner may be operated in response to the predetermined temperature.

Figure 3:
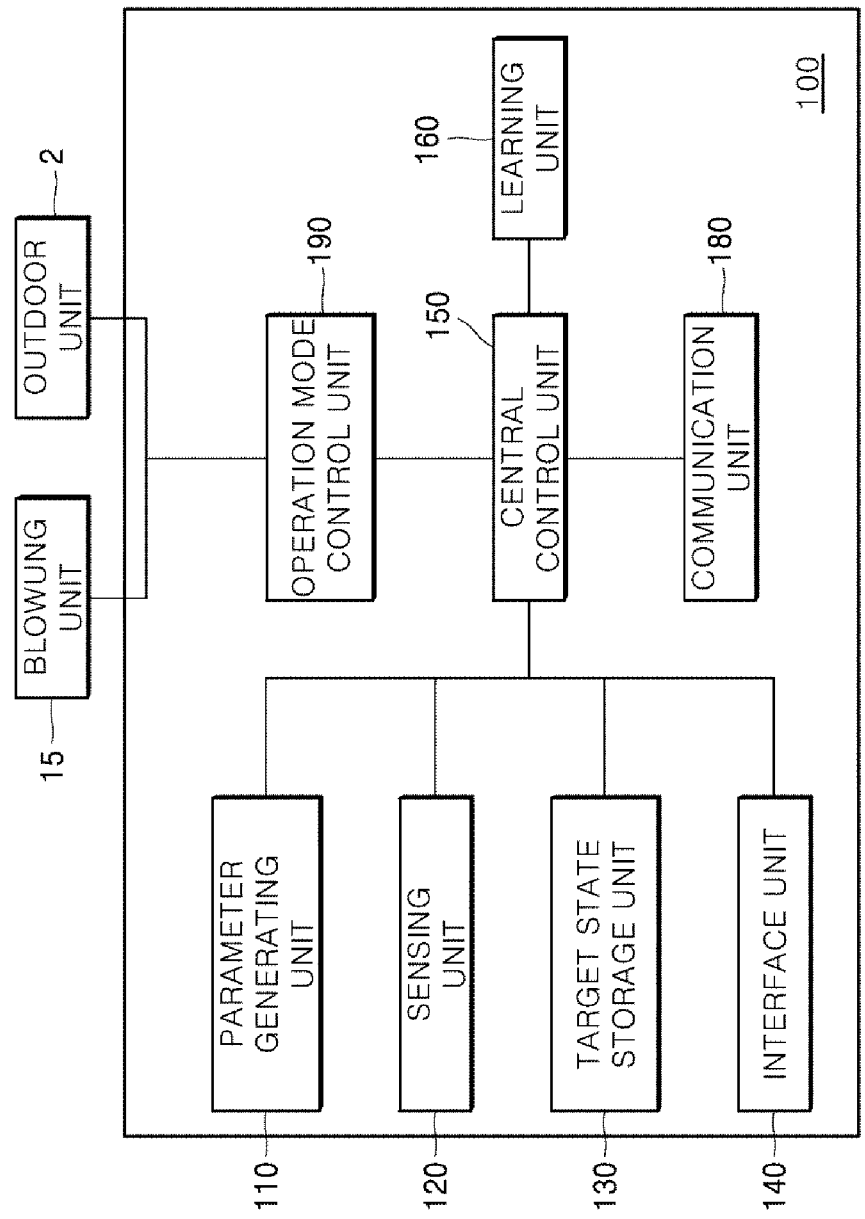
FIG. 3 shows a configuration of an internal learning based control module 100 according to an implementation of the present disclosure.

FIG. 3 shows a configuration of an internal learning based control module 100 according to an implementation of the present disclosure.

A parameter generating unit 110 generates a parameter such as a temperature or humidity measured or sensed by an indoor unit 1, or a rate of change in the temperature or humidity, and time consumed for each change, and the like. The sensing unit 120 may sense the temperature or the humidity for the parameter generated by the parameter generating unit 110. A sensed value may be provided to the parameter generating unit 110, and the parameter generating unit 110 may accumulate the sensed values in a separate memory, and generate the parameter. Thus, the parameter generating unit 110 may extract a learning factor, that is inputted to a learning unit 160, based on an environmental factor and product control information that can be identified by the control module 100 arranged in the indoor unit.

A target state storage unit 130 may include information on a target temperature or target humidity, and the like, set in an indoor unit 1. The target state may include one or more temperatures or one or more kinds of humidity. Further, the target state storage unit 130 may also optionally include two or more temperatures or two or more kinds of humidity. In this case, which value to be set as a target temperature or target humidity of the currently operating indoor unit 1 can be selected and set according to the control of a central control unit 150.

An interface unit 140 allows a user to control a temperature, humidity, air volume, and a wind direction, and the like, of an indoor unit 1, and provides a button type interface, a remote control type interface, or an interface for a remote adjustment, and the like. Further, the interface unit 140 can receive an interrupt input that changes a wind speed, air volume, or a temperature of the air discharged from a blowing unit 15. The interrupt input may be stored in a learning unit 160 as predetermined information.

The learning unit 160 may continuously accumulate values of the parameters (learning factors) generated by a parameter generating unit 110. The accumulated values of the parameters may be applied to a deep learning structure inside of the learning unit 160 to determine an optimum operation mode operated by an indoor unit 1 based on a change in a temperature or humidity, and the like. The operation mode may include various modes. In one implementation, the operation mode may include a small load mode/a standard load mode/an overload mode.

The information inputted as the learning factor of the learning unit 160 may be information generated or stored by and in the parameter generating unit 110 or a target state storage unit 130, and the like. In addition, the information inputted as the learning factor of the learning unit 160 may be information calculated or converted by a central control unit 150. The learning unit 160 may estimate a level of load by using a predetermined learning algorithm.

Alternatively, the learning unit 160 can set the relative degree of load based on a state of being operated up to now. It is possible to set an operation mode as −10%, −20%, and the like.

The central control unit 150 may control each of the components and can finally calculate an operation method needed for the indoor unit 1 to operate. The operation method of the indoor unit 1 can be divided into various methods. For example, it is possible to determine the operation mode information such as levels of loads (overload/standard load/small load) by estimating a current load in the indoor space with a few levels. The learning unit 160 may determine the operation mode, in which the indoor unit 1 should operate at present, based on the change in the temperature or the humidity and the time, and the like, and accordingly, the central control unit 150 can control a specific workload state of the air conditioner.

An operation mode control unit 190 operates based on an operation mode determined by a central control unit 150 and can be diversified depending on the type of a determined mode. As described above, when the operation mode includes the small load mode/the standard load mode/the overload mode, the central control unit 150 may select one of the operation modes based on information given by the above-mentioned parameter generating unit 110 and learning unit 160.

The operation mode control unit 190 may control a blowing unit 15 and an outdoor unit 2 based on the selected operation mode. For example, it is possible to perform a control, for example, controlling a wind speed dischargeable from the blowing unit 15, or controlling an amount of gaseous refrigerant that a compressor in the outer unit 2 compresses and discharges.

In one implementation, when the operation mode set by the operation mode control unit 190 is the overload mode, it is possible to increase at least one of the wind speed and the air volume of the blowing unit 15. In a case of the small load mode, it is possible to decrease at least one of the wind speed or the air volume of the blowing unit 15. In a case of the standard load mode, it is possible to maintain the wind speed of the blowing unit 15. Similarly, when the operation mode set by the operation mode control unit 190 is the overload mode, the outdoor unit 2 can control the compressor to operate at the maximum output. Further, in the case of the small load mode, the compressor can be powered off (off).

That is, the operation mode control unit 190 can control the blowing unit 15 or the outdoor unit 2 based on the operation mode information that sets the comfortable operation mode after the period operating in the rapid operation mode. Based on the operation mode information, the operation mode control unit 190 can control the wind direction and the air volume of the blowing unit 15.

As mentioned above, the rapid operation mode may only operate within a certain time range (for example, a preset time range such as 20 minutes or 30 minutes, and the like) to quickly change an indoor temperature. Then, the central control unit 150 can instruct the operation mode control unit 190 to switch the operation mode into the comfortable operation mode by using the operation mode information determined based on the parameters generated in the rapid operation mode.

The operation mode control unit 190 can control the blowing unit 15 and the outdoor unit 2 in various ways. In the implementation, it is possible to implement various operation modes by controlling the wind speed and the on/off time period of the compressor in the outdoor unit, respectively.

A configuration of the air conditioner including the internal learning based control module 100 will be summarized as follows. The air conditioner includes the blowing unit 15 that discharges the air for cooling or heating, and the parameter generating unit 110 that calculates one or more parameters during the first period of operation, the learning unit 160 that receives the parameters as the learning factor and outputs the operation mode information about an operation mode for a second period after the first period, the operation mode control unit 190 that controls the blowing unit 15 or the outdoor unit 2 in the second period based on the operation mode information, and the central control unit 150 that controls the parameter generation unit 110, the learning unit 160, and the operation mode control unit 190. The electrical power consumption per unit time during the second period is less than the electrical power consumption per unit time during the first period. The air conditioners with indoor unit 1 and the outdoor unit 2 operate in the rapid mode during the first period. The air conditioners with indoor unit 1 and the outdoor unit 2 can operate in a comfortable mode during the second period after the rapid mode, with a small amount of electrical power consumption by using the learning factors obtained during the operation of the air conditioner in the rapid mode.

In one implementation, at least one of an indoor initial temperature at a start time point of the first period (a period where the air conditioner is operated with a first cooling capacity, for example, the rapid mode), a target set temperature of the first period, a rate of temperature change in a preset initial time interval of the first period, a rate of a temperature change in the first period, and a time difference between a start time point and an end time point of the first period may be the parameter generated during the first period. Here, it is possible to use the information obtained by the sensing unit 120 or the target state storage unit 130 to generate such a parameter.

On the other hand, when an interrupt input is received from the interface unit 140 during the operation of the air conditioner during the second period (a period where the air conditioner is operated with a second cooling capacity, for example, in the comfortable mode), it is possible to update the learning unit 160 based on the received interrupt input.

In more detail, the central control unit 150 may provide the operation mode information and the interrupt input to the learning unit 160 to update the learning unit 160 or the operation mode information. When it is changed due to an update of the learning unit 160 or the operation mode information is updated, the operation mode control unit 190 may be provided with updated operation mode information again.

One or more of the components described with reference to FIG. 3 may be implemented by at least one processor that is operably connected to at least one computer memory storing instructions that perform various operations described herein when executed by the at least one processor.

Figure 4:
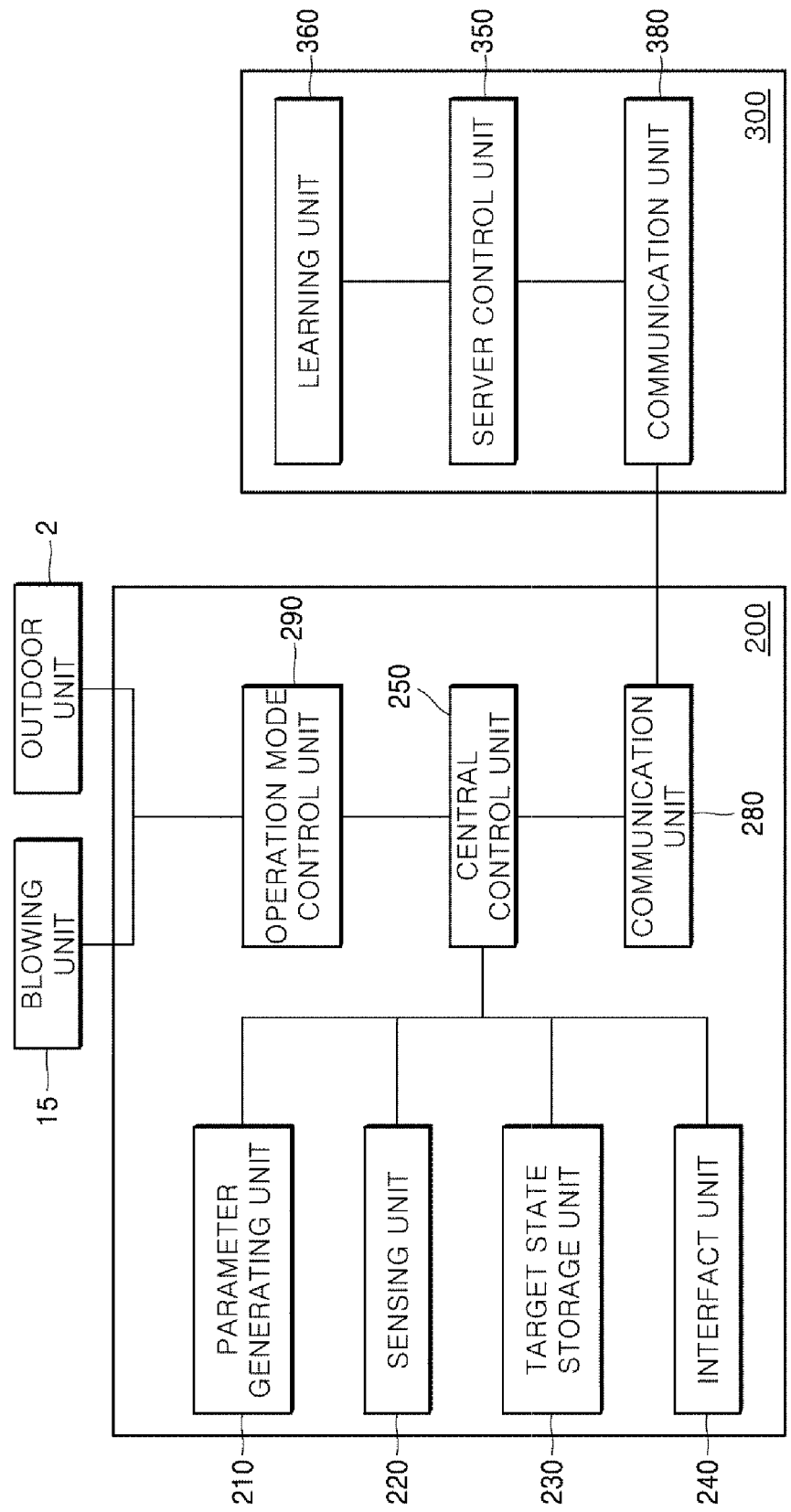
FIG. 4 shows a relationship between a cloud server 300 that performs the external learning and an external learning based control module 200 and the respective components.

FIG. 4 shows a configuration of an external learning based control module according to an implementation of the present disclosure. FIG. 4 shows relations among a cloud server 300 that performs external learning, an external learning based control module 200 and their respective components.

Since a parameter generating unit 210, a sensing unit 220, a target state storage unit 230, an interface unit 240, and an operation mode control unit 290 of the components of the external learning based control module 200 may be formed in the same manner as the parameter generating unit 110, the sensing unit 120, the target state storage unit 130, the interface unit 140, and the operation mode control unit 190 as shown in FIG. 3, the description thereof can be replaced with the description of the same components in FIG. 3.

A central control unit 250 may control the respective components and finally transmit parameters (i.e., learning factors) needed for determining an operation method required for an indoor unit 1 to operate to a cloud server 300 by controlling a communication unit 280. A server control unit 350 of the cloud server 300 may receive a learning factor transmitted by the control module 200 from a communication unit 380 and input the received learning factor to a learning unit 360 to determine an operation mode suitable for the control module 200. The information on the determined operation mode may be transmitted to the control module 200 via the communication unit 380.

Figure 10:
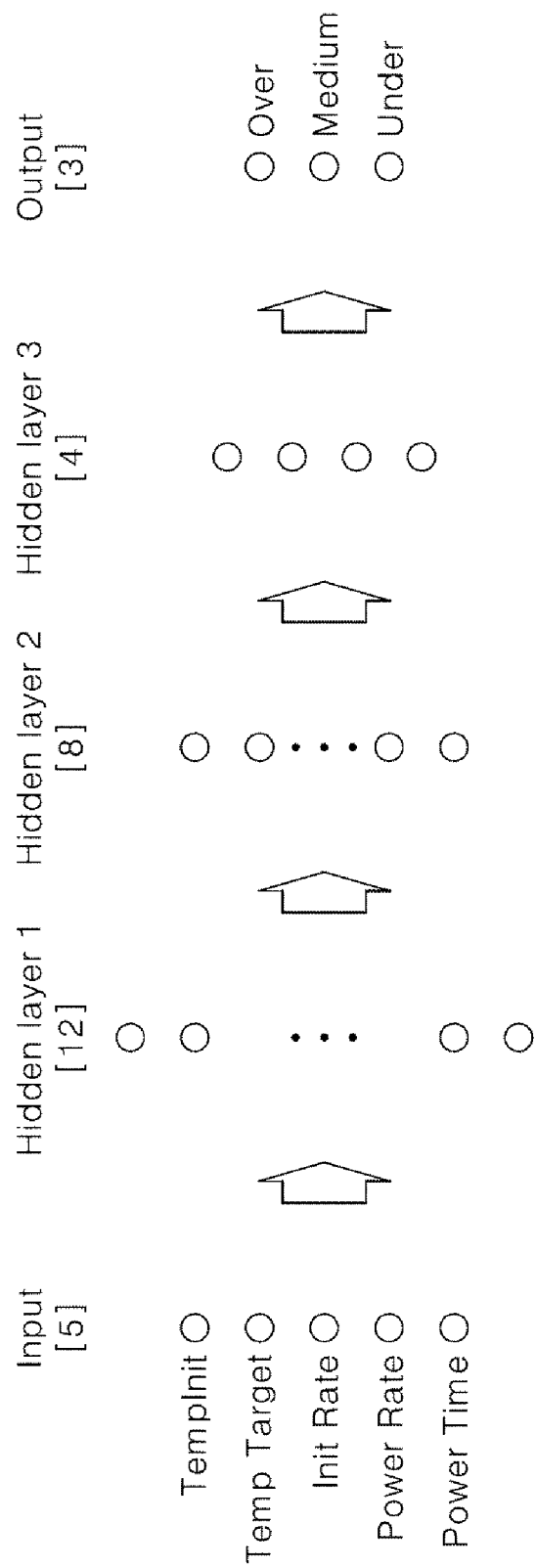
FIG. 10 shows a configuration of a learning algorithm included in a learning unit according to an implementation of the present disclosure.
Figure 13:
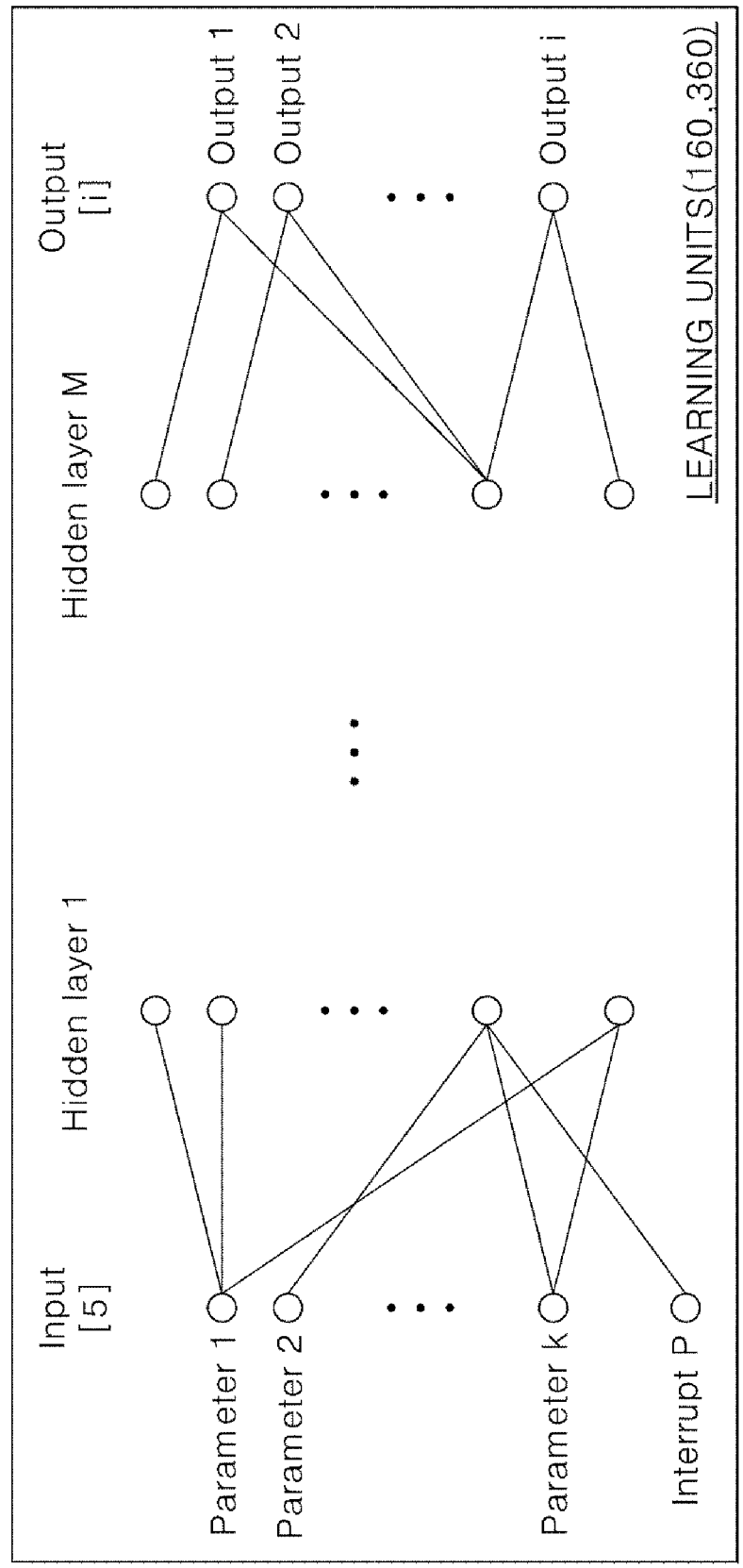
FIG. 13 shows a configuration of a learning unit according to an implementation of the present disclosure.
Figure 14:
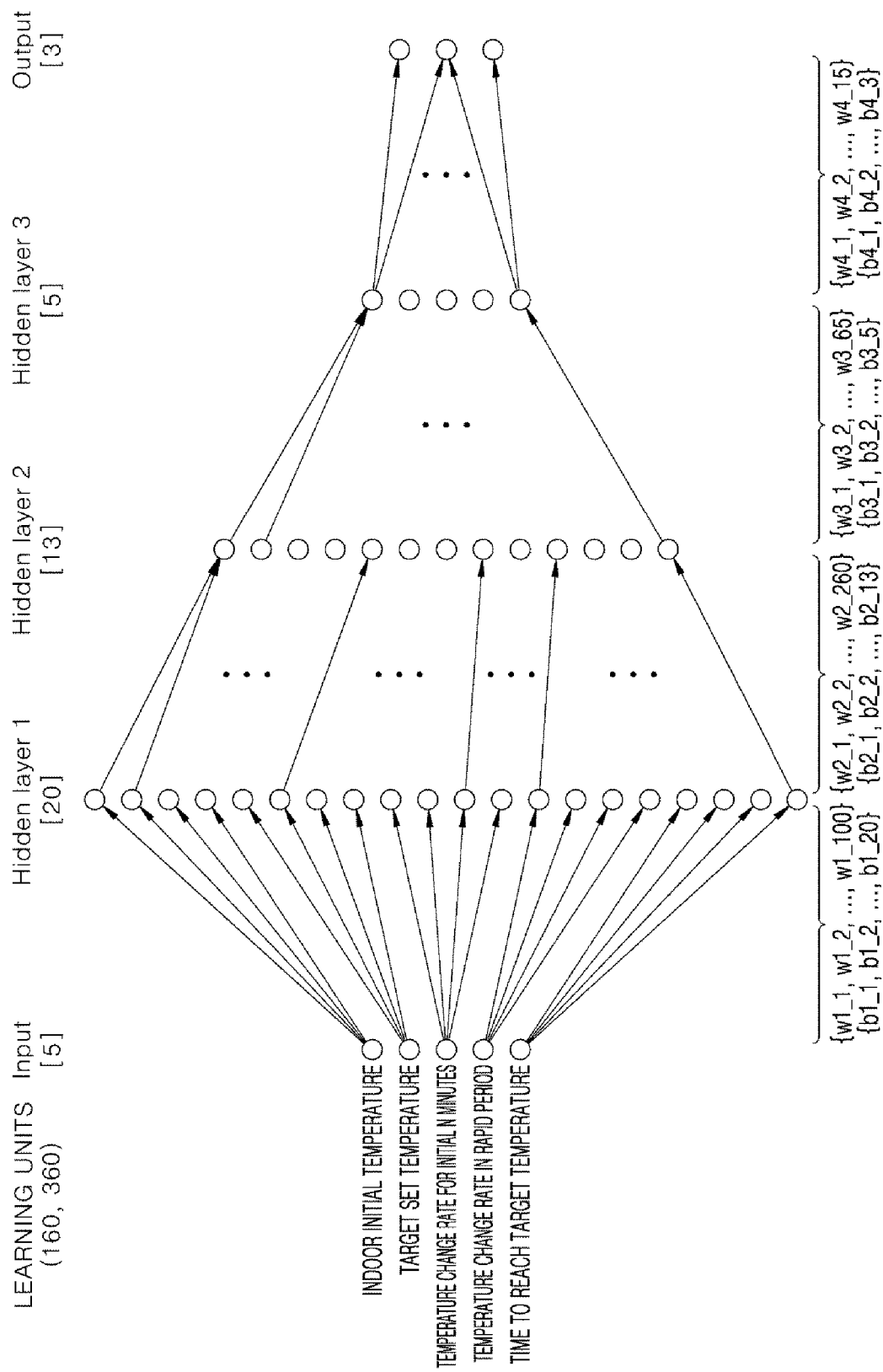
FIG. 14 shows an exemplary configuration of a learning unit according to an implementation of the present disclosure.

As shown in FIGS. 10, 13, 14, the learning unit 360 may include an artificial neural network, and learning unit 360 generate links between one or more hidden layers and each input/output factor, and bias or the weight of each link of the network in a learning process, and may store information updated from the outside. In this case, the learning unit 360 can store the different versions to the cloud server 300.

The cloud server 300 may receive the learning factor from the plurality of control modules and determine the operation mode in response to the learning factor. Further, it is possible to update the learning unit 360 by continuously inputting the learning factor provided by the plurality of control modules, to the learning unit 360. The learning unit 360 can estimate a level of load by using a predetermined learning algorithm.

The cloud server 300 of FIG. 4 is summarized as follows.

The communication unit 380 may receive one or more parameters determined in an operation mode during a first period by M number of air conditioners and transmit operation mode information to the M number of air conditioners, respectively. The learning unit 360 may receive a parameter of a first air conditioner out of the M number of air conditioners as a learning factor and may output operation mode information on an operation mode for the first air conditioner during a second period after the first period.

A first cooling capacity for the first period and a second cooling capacity for the second period may be set differently. For example, the first cooling capability may be an operation mode in which a wind speed, air blowing volume, and a temperature of a refrigerant, and the like is increased, so as to rapidly drop a temperature of an target inner space with the maximum cooling capability. The above-mentioned operation mode provides an environment having a certain level of temperatures, where a user can rapidly feel comfortable for certain time (a short period of time). On the other hand, the second cooling capability may be an operation mode in which less energy is consumed while maintaining the certain level of temperatures, after the environment enabling the user to feel a comfort is provided. Alternatively, the second cooling capability that increases the wind speed or the air volume can also be provided when the temperature of air discharged from the air conditioner cannot reach the level of temperatures giving the user the feeling of comfort.

The server control unit 350 can control the learning unit 360 and the communication unit 380. Further, the operation mode information may be outputted such that an electric power consumption per unit time during the second period of the first air conditioner is less than a electrical power consumption per unit time during the first period of the first air conditioner out of the plurality of air conditioners. The outputted operation mode information may be transmitted to the air conditioner (the first air conditioner) through the communication unit 380.

In one implementation, the parameters transmitted by each air conditioner may include various kinds of information calculated by each air conditioner. In one implementation, the parameter generated in the first period may be at least one of an indoor initial temperature at a start time point of the first period, a target set temperature of the first period, a temperature change rate for a preset initial time interval of the first period, a temperature change rate during the first period, and a time different between a start time point and an end time point of the first period. Here, it is possible to use the information obtained by the sensing unit 120 or the target state storage unit 130 so as to determine each parameter.

When the implementations shown in FIG. 3 or FIG. 4 are applied, it is possible to estimate a load in a current state of the indoor space with a few levels (for example, a small load, a standard load, and an overload) by learning an environmental factor and control information until a time point when a target temperature is reached after an air conditioner is turned on.

It is also possible to learn a correlation between a learning factor until a time point when the target temperature is reached, and a temperature pattern for cooling (or heating) after the target temperature is reached, and automatically operate a custom cooling mode (or a custom heating mode) according to a determined level of load so that an automatic operation is possible in a power saving mode, a comfortable cooling (or heating) mode depending on an indoor load level after the target temperature is reached without a user additionally operating the air conditioner.

Further, when each air conditioner transmits an interrupt input generated during an operation of each air conditioner in the second period, the communication unit 380 can receive the interrupt input from each of the air conditioners and update the learning unit 360 based on the received interrupt input.

In more detail, the server control unit 350 may provide the learning unit 360 with the operation mode information and the interrupt input to update the learning unit 360 or update the operation mode information. When the learning unit 360 or the operation mode information is updated, the updated operation mode information may be provided to the air conditioner via the communication unit 380 again.

When the implementations shown in FIG. 3 or FIG. 4 are applied, the level of load of the air conditioner can be estimated so as to reflect an environmental element that influences on a cooling efficiency, such as space size, an insulation state, a difference in temperature between an indoor and an outdoor, and the like after the target temperature is reached. Thus, the air conditioner can perform efficient cooling after the target temperature is reached, which is a result obtained by the learning units 160 and 360, that various learning factors are inputted to the learning units 160 and 360. The learning factors are determined in a process in which the temperature reaches the target temperature. Learning factors determined in the process in which the temperature reaches the target temperature are described in the below.

One or more of the components described with reference to FIG. 4 may be implemented by at least one processor that is operably connected to at least one computer memory storing instructions that perform various operations described herein when executed by the at least one processor.

Figure 5:
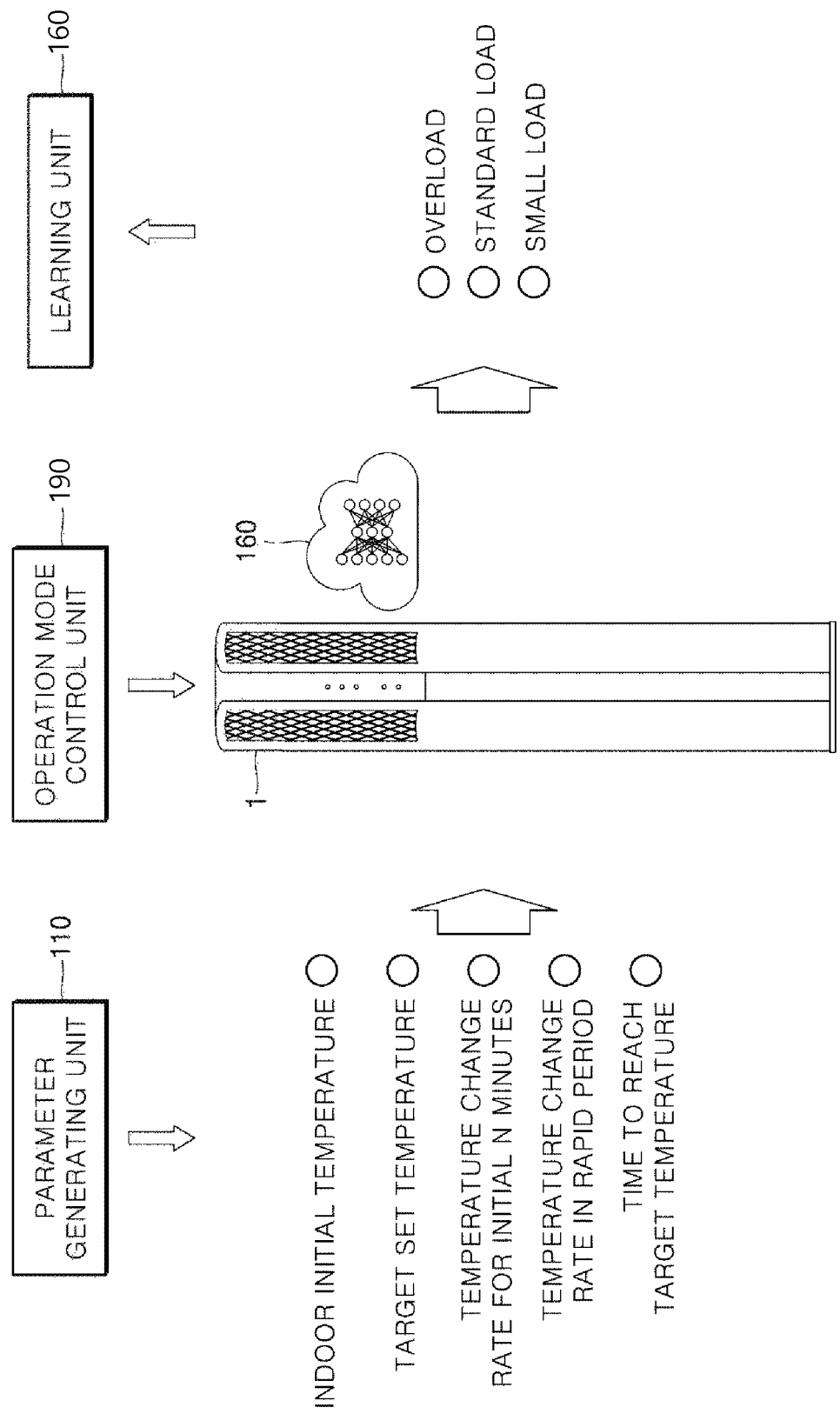
FIG. 5 shows a process in which an inner learning based control module calculates at least one result factor from at least one learning factor according to an implementation of the present disclosure.

FIG. 5 shows a process in which an inner learning based control module calculates at least one result factor from at least one learning factor according to an exemplary implementation of the present disclosure.

A parameter generating unit 110 may generate one or more parameters, that is, one or more learning factors. The internal learning based control module 100 can obtain at least one result factor using the one or more parameters. In some implementations, the at least one result factor instructs or includes information regarding an operation for an indoor unit to operate, e.g., an operation mode. In an implementation, the one or more parameters that the parameter generating unit 110 generates may include an indoor initial temperature sensed at the time when an air conditioner starts to operate, a target set temperature, an initial N minute temperature change rate, a temperature change rate in the rapid period, a time to reach a target temperature, and the like. The temperature change rate for initial N minutes may be a rate at which a temperature changes for 3 minutes or 5 minutes immediately after the air condition starts to operate, for example. Of course, a temperature difference for a certain time period may be used.

In the implementation, the above-mentioned parameters include various kinds of information obtainable while the indoor unit 1 performs an initial operation.

The parameters that the parameter generating unit 110 generates may be inputted in the control module 100 and a learning unit 160 of the control module 100 may perform predetermined learning by using the inputted parameters (learning factors). The learning unit 160 may apply a deep learning module. The learning unit 160 may input the inputted parameter to network that forms deep learning and calculate at least one result factor, e.g., which instructs or includes information regarding an operation mode. In one implementation, the parameters are an initial temperature (TempInit), a target set temperature (TempTarget), a temperature change rate for initial 3 minutes (InitRate), a temperature change rate in a rapid period (PowerRate), and a time to reach the target temperature (PowerTime). According to the calculated operation mode, the air conditioner is instructed to increase or decrease an cooling (heating) output of an air conditioner to cope with different load levels, such as an overload/a standard load/a small load, based on a current operation mode. Alternatively, the calculated or generated operation mode can numerically adjust an operation output based on the operation mode currently being performed, or based on the current operation condition.

An operation mode control unit 190 may control an indoor unit 1 or an outdoor unit 2 according to the determined operation mode.

Figure 6:
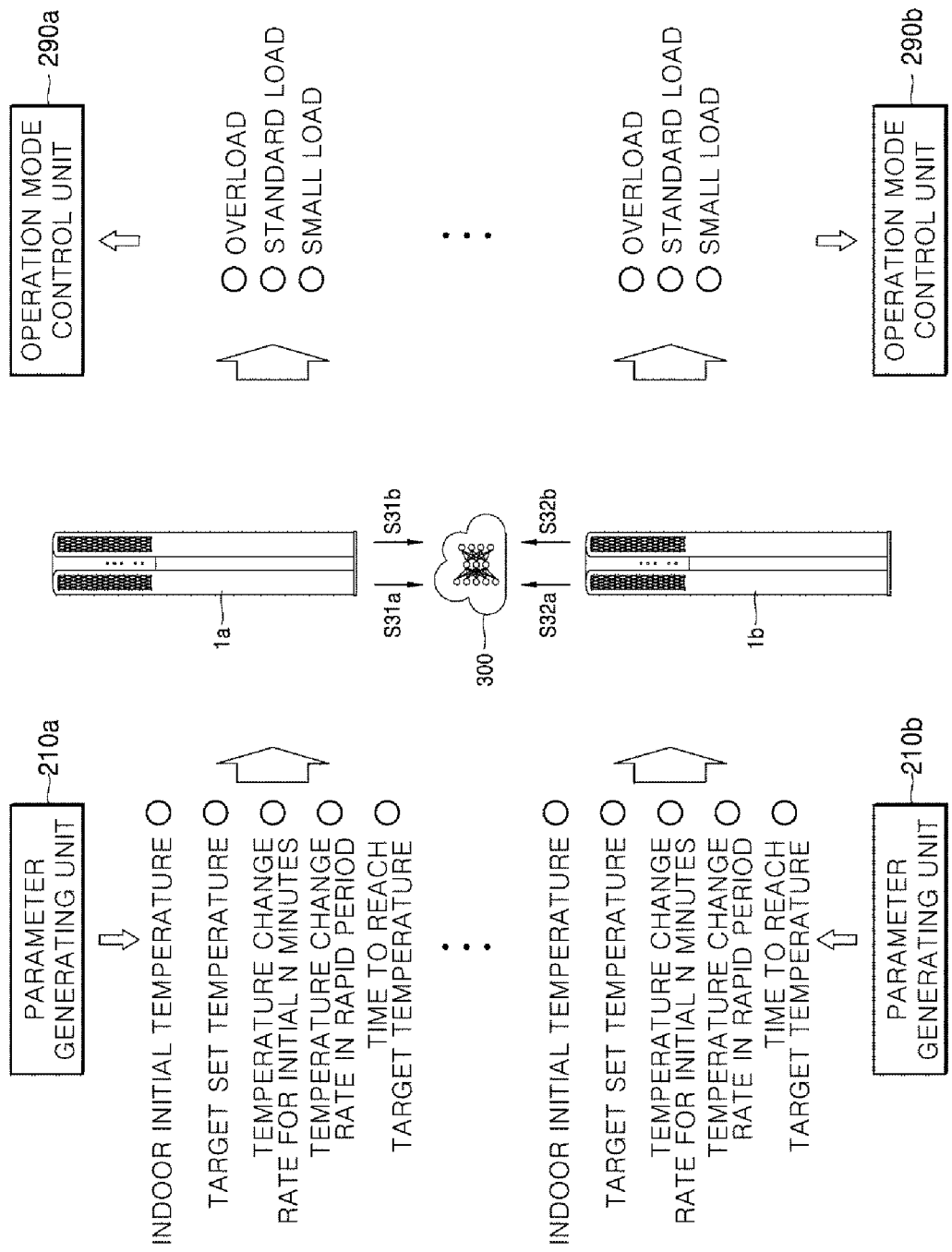
FIG. 6 shows a process in which an external learning based control module calculates at least one result factor from at least one learning factor according to an implementation of the present disclosure.

FIG. 6 shows a process in which an external learning based control module calculates at least one result factor from one or more learning factors according to an implementation of the present disclosure. FIG. 6 shows a process in which a plurality of indoor units 1 and the control modules and a learning unit 360 of a cloud server 300 calculate information on an operation mode required for each indoor unit 1 to operate.

A parameter generating unit 210a included in a control module of a first indoor unit 1a may generate one or more parameters, i.e., learning factors, so as to calculate a result that instructs an operation method (i.e., an operation mode) required for an indoor unit to operate. As shown in FIG. 5, in one implementation, the parameter that the parameter generating unit 210a generates may be an initial room temperature sensed at a time point when an air conditioner starts to operate, a target set temperature, an initial N minutes temperature change rate, a temperature change rate in the rapid period, and a time to reach the target temperature, and the like. The temperature change rate for initial N minutes means a rate at which the temperature changes for 3 or 5 minutes immediately after the air condition starts to operate, for example. Of course, a temperature difference for a certain time period may also be used.

The generated parameter may be transmitted to a cloud server 300 as exemplified in S31a, and the cloud server 300 may input the received parameter to a learning unit 360.

Similarly, a parameter generating unit 210b included in a control module of a second indoor unit 1b may generate one or more parameters, i.e., learning factors, so as to calculate a result that represents an operation method an operation mode) required for an indoor unit to operate. The generated parameter may be transmitted to a cloud server 300 as exemplified in S31b, and the cloud server 300 may input the received parameter to a learning unit 360.

The learning unit 360 in the cloud server may performs a predetermined learning by using the inputted learning factors. The learning unit 360 may apply a deep learning module. Then, the learning unit 360 may input the inputted parameters to the network that forms deep learning to calculate at least one result factor, e.g., which instructs or includes information regarding an operation mode. The operation modes can be calculated or generated for each of the indoor units 1a and 1b. The generated operation mode increases or decreases an cooling (heating) output of an air conditioner to cope with different load levels, such as an overload/a standard load/a small load, based on a current operation mode. Alternatively, the determined operation mode can numerically adjust an operation output based on the operation mode currently being performed.

The operating mode determined for each of the indoor units 1a and 1b may be transmitted to each of the indoor units 1a and 1b again (S32a and S32b) and the operation mode control units 290a and 290b of each of the indoor units may be operated according to the operation mode that the cloud server 300 transmits. That is, the operation mode control units 290a and 290b may control the indoor units 1a and 1b and/or an outdoor unit 2 according to the determined operation mode.

As shown in FIGS. 5 and 6, an environmental factor for a load estimation and product control information are inputted to the learning unit 160, as learning input factor, arranged in the indoor unit 1 or to the learning unit 360 arranged in the cloud server 300 in order to obtain learning results. These results may be used to determine an operation mode. In one implementation, the determined operation mode may be represented as modes for different steps of load, such as an overload mode/a standard load model/a small load mode). Alternatively, the operation load (i.e., the cooling operation output of the air conditioner) may be adjusted based on the operation mode currently being performed or based on the current operation condition. Such adjustment may be expressed in percentage (%).

As shown in FIG. 5, in the method of estimating a load requested for determining an operation mode based on the inner learning based control module, the environmental factor and the product control information may be generated as the parameter referred to as the learning factor and the generated parameter may be provided as the learning factor of the learning unit 160 to calculate a load result by applying a learning algorithm arranged in the learning unit 160.

As shown in FIG. 6, in the method of estimating a load requested for determining an operation mode based on the external learning based control module, the environment factor and the product control information may be generated as the parameter referred to as the learning factor and the generated parameter may be provided as the learning factor of the learning unit 360 of the cloud server 300 to calculate a load result by applying a learning algorithm in the learning unit 360.

In the implementation as shown in FIG. 6, after each air conditioner starts to do a smart care, and operates according to the maximum cooling capacity, and then after it enters a comfortable mode or a certain time has passed, it is possible to transmit the predetermined parameter to the cloud server 300 and receive operation mode information that sets a current cooling operation output of air conditioner so as for the air conditioner to perform the comfortable mode. The smart care operation means that the air conditioner operates the rapid mode and the comfortable mode automatically without user's control.

Figure 7:
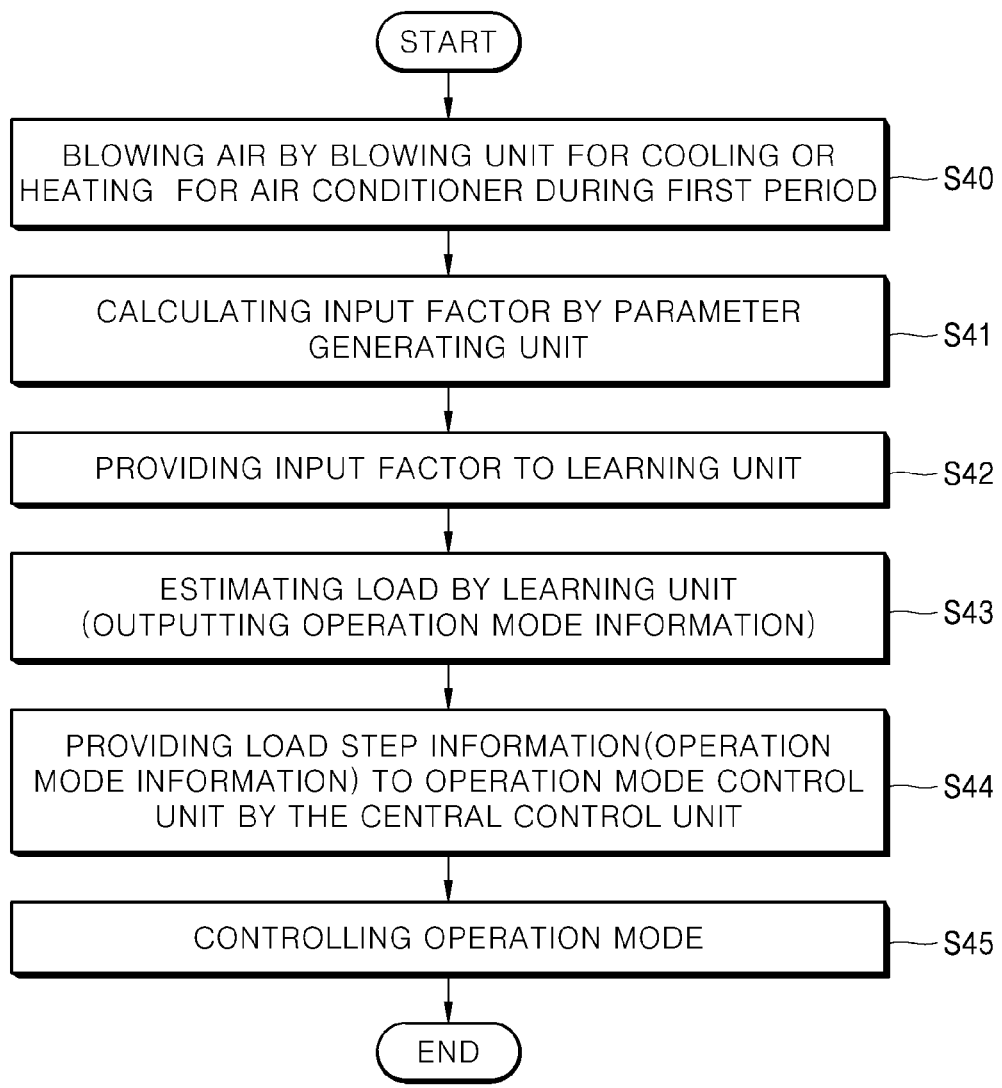
FIG. 7 shows a process in which an internal learning based control module operates according to an implementation of the present disclosure.

FIG. 7 shows a process in which an internal learning based control module operates according to an implementation of the present disclosure.

In an air conditioner driven on a learning base, a blowing unit 15 may discharge air for cooling or heating during a first period (S40). In one implementation, during the first period, the air conditioner may operate in a rapid mode, and during a second period after the first period the air conditioner may operate in a comfortable mode. During the first period, a target temperature may be reached in a short period of time. During the second period, it is possible to maintain an indoor temperature within a predetermined deviation range from the target temperature.

A parameter generating unit 110 calculates an input factor to be inputted to a learning unit 160, i.e., a learning factor (S41). That is, the parameter generating unit 110 can generate various parameters in the first period. When the input factor is provided to the learning unit 160 (S42), the learning unit 160 estimates a load (S43). In one implementation, the learning unit 160 receives the generated parameter as a learning factor to output operation mode information for the second period after the first period.

Thereafter, when a central control unit 150 provides an estimated load step information (outputted operation mode information) to an operation mode control unit 190 (S44), the operation mode control unit 190 controls an operation mode of an indoor unit 1 and/or an outdoor unit 2 (S45).

In one implementation, as exemplified in S44 and S45, when the central control unit 150 provides the operation mode control unit 190 with the operation mode information outputted by the learning unit 160, the operation mode control unit 190 controls the blowing unit 15 or the outdoor unit 2 in the second period based on the operation mode information. Based on the process in FIG. 7, in comparison of an electrical power consumption per unit time during the first period of the air conditioner with an electrical power consumption per unit time for the second period, the latter is less than the former. That is, after operating in the rapid mode so that an indoor temperature reaches a target temperature within a short period of time in the first period, the temperature of reaching the target temperature may be maintained based on the small amount of electrical power consumption at the target temperature or an indoor temperature may be maintained within a predetermined range. The operation mode information on the second period may be determined depending on the parameters generated by the learning unit 160 in the first period. Therefore, when the parameters generated in the first period are different from each other, the operation mode information on the second period may vary.

Figure 8:
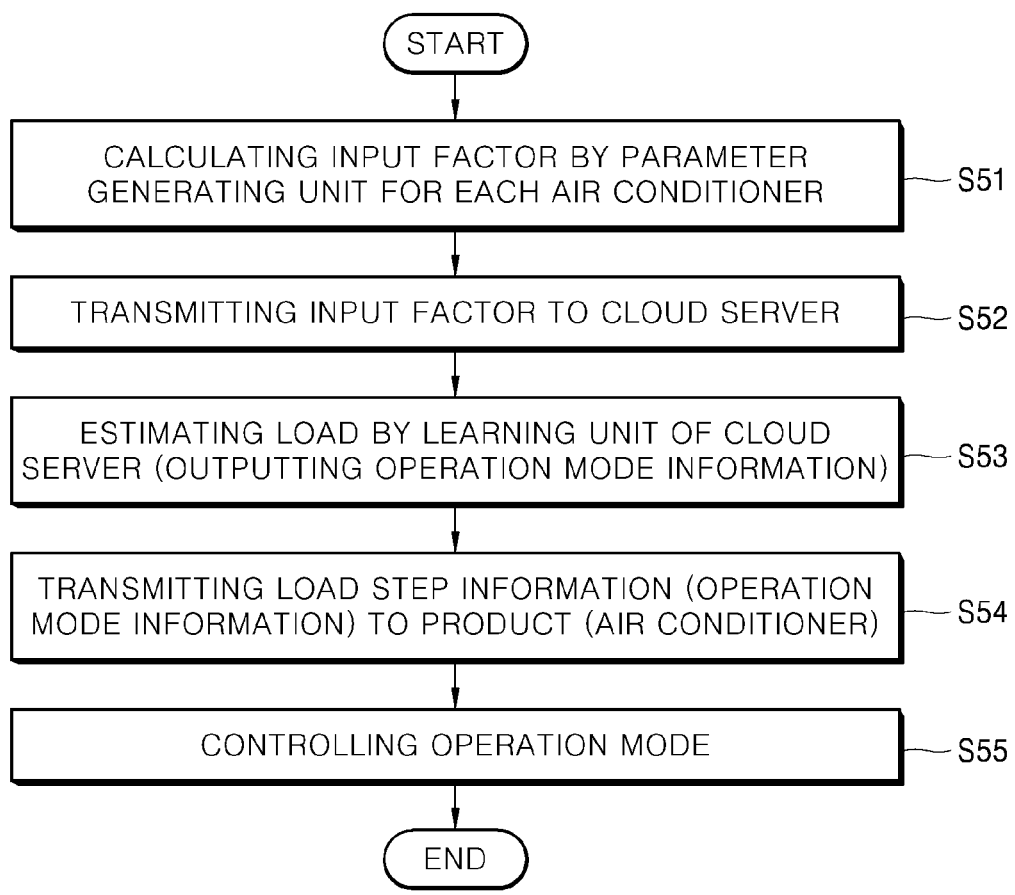
FIG. 8 shows a process that an external learning based control module operates according to an implementation of the present disclosure.

FIG. 8 shows a process in which an external learning based control module operates according to an implementation of the present disclosure.

A parameter generating unit 210 may extract an input factor to be inputted to a learning unit 360 of a cloud server 300, i.e., a learning factor (S51). When the input factor is transmitted to the cloud server 300 (S52), the learning unit 360 of the cloud server 300 may estimate a load (S53). At this time, as the cloud server 300 receives the learning factor from the plurality of products, it is possible to estimate a load for each air conditioner by inputting the learning factor to the learning unit 360 for each air conditioner. Then, the cloud server 300 transmits an estimated load step to the air conditioner, i.e., operation mode information (S54). A central control unit 250 of each air conditioner provides the load step received from an operation mode control unit 290 and the operation mode control unit 290 of each air conditioner controls an operation mode of an indoor unit 1 and/or an outdoor unit (S55).

The process of FIG. 8 is described below.

The cloud server controls a driving of a plurality of air conditioners based on learning. In each of the air conditioners, the parameter generating unit 210 generates a parameter in an operation mode of a first period (S51). A communication unit 380 receives one or more parameters generated in the operation mode of the first period from a first air conditioner of the plurality of air conditioners (S52). The process may occur in a continuously accumulative manner and the parameters generated by the plurality of air conditioners may be accumulated in a cloud server 300, and the cloud server 300 may have a database additionally.

The learning unit 360 receives the parameter received from each of the air conditioners as the learning factor and outputs operation mode information on an operation mode of the air conditioner for the second period after the first period (S53). Through a control of a server control unit 350, the communication unit 380 can transmit the operation mode information outputted by the learning unit 360 to each of the air conditioners.

FIG. 8 shows that the cloud server 300 provides operation mode information needed for the air conditioner to operate during the second period based on the parameters transmitted by each air conditioner. At this time, an electrical power consumption unit per unit time during the second period of the air conditioner is less than an electrical power consumption per unit time during the first period of the air conditioner.

In FIG. 8, the learning unit of the cloud server may obtain various kinds of information needed for estimating a load in a learning process or may directly receive the information from an outside. For example, the learning unit of the cloud server may include a hidden layer as shown in FIGS. 10 and 13, and the like. Information on a setting for each node of the hidden layers, a link or bias between the two nodes, the weight of a link or a node may be preset and then changed in the learning process. Further, it is possible to apply the information obtained from additional monitoring and learning to the learning unit. Here, the outside means a separate server from the cloud server. Alternatively, it is possible to couple a storage medium such as a distinct memory card to the cloud server to apply the information stored in the storage medium to the learning unit.

Based on the implementation in FIG. 7 or 8, it is possible to apply a method of estimating a learning-based load for an efficient cooling control of an air conditioner. In this process, a load estimation (an output of operation mode information) for the second period may be made for each step through learning based on the environmental factors and control information which are obtainable at time point when a target temperature is reached, and/or obtainable from a temperature change pattern up to a certain time point after the target temperature is reached.

Further, according to an estimated load level, the temperature is set so that a power saving or comfortable cooling is possible during the second period, and the learning units 160 and 360 may output operation mode information according to which air volume/wind direction, and the like, can vary.

As shown in FIGS. 3 and 7, in one implementation, when a learning logic (learning unit) 160 for load estimation is provided on the product, the internal learning based control module 100 may be installed in the air conditioner. Further, when the learning logic (learning unit) 360 for load estimation is provided on the cloud server, the external learning based control module 200 is installed in the air conditioner, and the cloud server 300 receives the environmental factor and the product control information from the control module 200 through the wireless communication, and analyzes or re-learns it.

Figure 9:
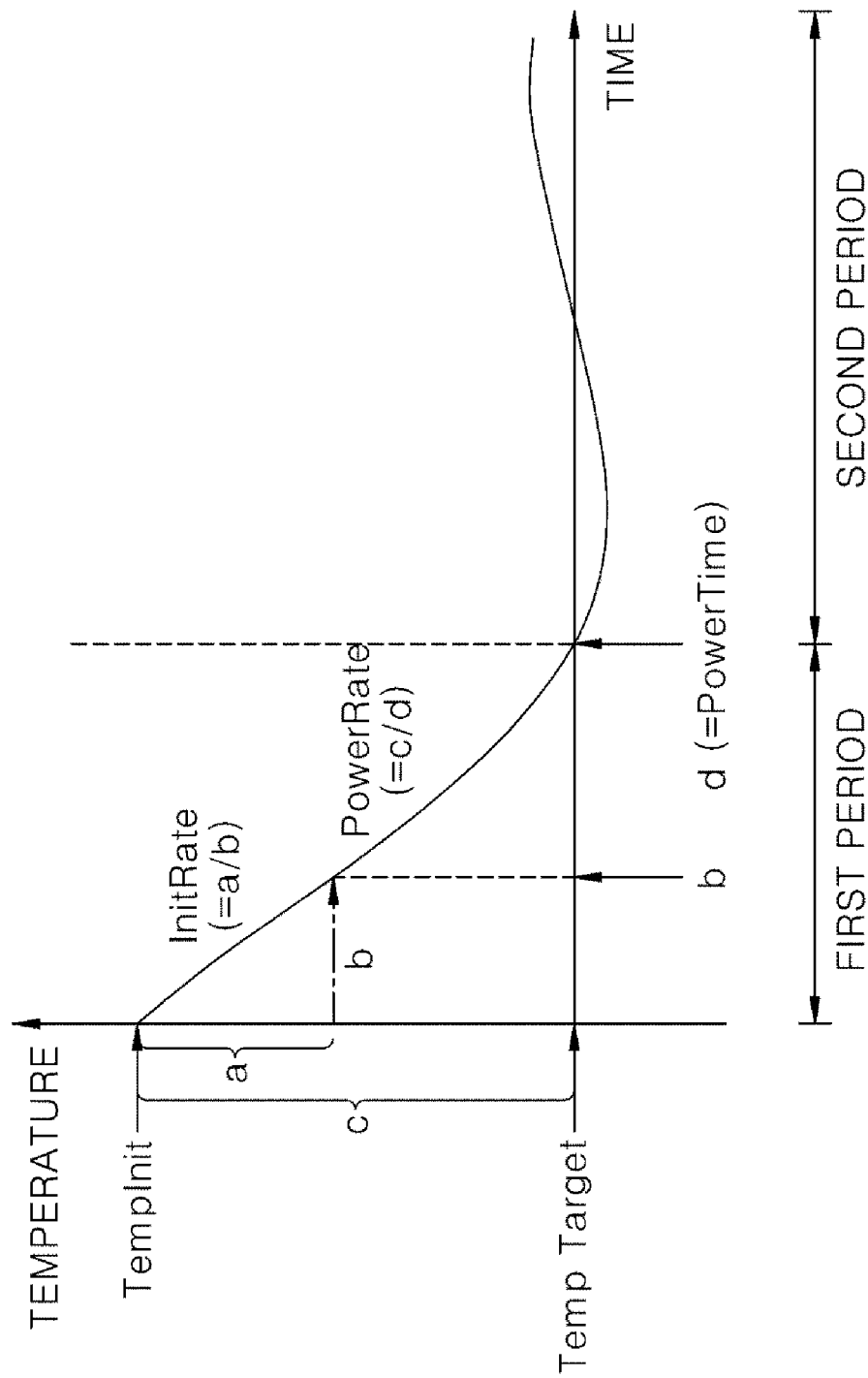
FIG. 9 shows that a parameter generating unit calculates an input factor according to an implementation of the present disclosure.

FIG. 9 shows that a parameter generating unit obtains an input factor according to an implementation of the present disclosure. In the graph, the temperature is expressed as a Y-axis and the time is expressed as an X-axis. The graph shows a change in temperature with time. FIG. 9 shows an example of an input factor for learning, and an example of Obtaining a learning factor such as control information on a product end and a temperature change rate obtained from a temperature change with time.

In the above implementation, as an input factor generated by a parameter generating unit, an indoor initial temperature, a target set temperature, and a temperate change rate for initial N minutes, a temperature change rate in a rapid period, and a time to reach the target temperature, and the like are described. Here, N can be selected in various ways. In some cases, N is 3 minutes in the implementation in FIG. 9.

FIG. 9 shows that the parameter generating units 110 and 210 can generate an initial temperature (TempInit) and a target set temperature (TempTarget). The initial temperature (TempInit) can be generated by sensing the indoor initial temperature by the sensing units 120 and 220. The target set temperature (TempTarget) may be generated based on a target set temperature stored in the target state storage units 130 and 230. On the other hand, the parameter generating units 120 and 220 can calculate a temperature change rate for initial three minutes (InitRate) as a/b.

The term "b" means a time passage after an air conditioner operates. For example, "b" may be three minutes or five minutes. The term "a" means a magnitude of a temperature change in TempInit during time b.

On the other hand, the temperature change rate in the rapid period (PowerRate) can also be calculated as c/d. The term "c" means a temperature difference between TempTarget and TempInit. Therefore, the term "c" may be "TempInit−TempTarget". The time (PowerTime) at which the temperature reaches a target temperature can be calculated as "d". In one implementation, d means time consumed to reach a set temperature as quickly as possible by performing an operation with the maximum cooling capacity for the maximum of M minutes, and includes a time magnitude of 15 minutes or 20 minutes in one implementation. It is possible to determine an overload/a standard load/a small load by setting a cooling capability to be performed in a comfortable mode (a second period) at time point "d".

The mode in a first period (a rapid operation mode or a rapid period) enables the air conditioner to drive and the temperature of the air conditioner to reach a target temperature. In an implementation, in the first period mode, the air conditioner is operated in a high speed cooling manner till the target set temperate with a maximum cooling power of the air conditioner at the beginning of cooling.

In FIG. 9, the target temperature may be set to a specific target temperature value, but may be within a certain range. For example, when the target temperature value is 20 degrees, the current temperature may reach 20 degrees as an example of reaching the target temperature. However, in another implementation of reaching the target temperature, it is possible to determine to reach the target temperature even when a current temperature reaches a state of +1° C. or −1° C. (i.e. 19° C. to 21° C.) based on 20 degrees.

The determination of reaching the target temperature can be applied to a case where a range of time at which the air conditioner can be operated in the rapid period is preset. For example, it is assumed that the time at which the air conditioner is operated in the maximum cooling capacity with rapid period (rapid enable time) is predetermined such as 10 minutes or 15 minutes. If the air conditioner operates and does not reach the target temperature even if the air conditioner is operated even after the rapid enable time, the parameter generating units 110 and 210 may take a current temperature as a learning factor instead of the target, temperature.

Then, when the temperature of the air conditioner reaches the target temperature, it is possible to change the mode for the first period (the rapid period) with another mode for the second period (a comfortable period). Further, even if the temperature of the air conditioner does not reach the target temperature, when a certain time has passed or a current temperature closely approaches the target temperature, the operation mode of the air conditioner can be changed to the comfortable mode. In one implementation, the second period (the comfortable period) is a comfortable operation, and includes maintaining the set temperature after reaching the target temperature and operating in an auto mode (indirect wind).

When an external influence to the space is significant or a space is wide, An indoor temperature cannot reach a target temperature. Accordingly, it is possible to change the mode for the rapid period (the first period) with another mode for the comfortable period (the second period) even when the temperature of the air conditioner reaches the target temperature in some degrees.

Then, the operation mode for the second period (the comfortable period) may be selected in a different manner with the first period (the rapid period). As described above, the learning units 160 and 360 may use five learning factors (TempInit, TempTarget, InitRate, PowerRate, and PowerTime) that the parameter generating units 110 and 210 generate an operation mode of an air conditioner in a comfortable period, i.e., an operation mode.

In FIG. 9, an absolute value of a rate of temperature change per hour in the first period operating in the rapid operation mode is greater than an absolute value of a rate of temperature change per hour in the second period operating in the comfortable operation mode. The temperature is changed at a rapid speed in the rapid operation mode and the changed temperature is maintained in the comfortable operation mode.

Further, the difference between the temperature of the space and the target set temperature is included in a preset predetermined temperature band or the difference is maintained for certain time in the second period (the comfortable operation mode), the central control units 150 and 250 may instruct a switch to a rapid operation mode to the operation mode control units 190 and 290 for rapid cooling or heating the space. In this case, the operation mode control units 190 and 290 can control a blowing unit 15 and an outdoor unit 2 so that the air conditioner operates in the rapid operation mode for rapidly lowering the temperature of the space as shown in the first period. When a difference in temperature is 2 degrees or more, or when a certain level of difference in temperature is maintained for 5 minutes or more, the air conditioner can be operated in the rapid operation mode to lower the room temperature quickly.

In addition, it is possible to switch the operation mode to a humidity control operation mode when the humidity is a predetermined reference or more (for example, 70% or more) in the comfortable operation mode or when the humidity is maintained for 5 minutes or more. When the central control units 150 and 250 may continuously monitor the humidity, and the humidity reaches the predetermined reference, it is possible to instruct the operation mode control units 190 and 290 so as to stop the comfortable operation mode and start to operate in humidity control operation mode. Then, when the humidity reaches a certain level or less (for example, 50% or less) and this humidity is maintained for a certain time or more (for example, 5 minutes or more), it is possible to release the humidity control operation mode and start the comfortable operation mode again.

According to the implementation described in FIG. 9, it is possible to estimate a load based on the environmental factors that the air conditioner can obtain. This may includes obtaining a property of a cooling environment in a space, which the air conditioner is arranged, as various learning factors and determining the load based on the obtained various learning factors. Further, determining the load is not based on a simple function, but it is possible to determine an optimum load with respect to the learning factor by using a deed learning algorithm that a learning unit 360 of a cloud server 300 or a learning unit 160 in a control module 100 in the air conditioner provides. As a result, in the second period, the air conditioner can be operated by selecting a power saving or comfortable cooling, and the like, according to a load step.

Conventionally, as an environmental change is not considered after the rapid period, there is a problem that a user controls the temperature again in the comfortable period after the rapid period ends. However, in the implementation of the present disclosure, it is possible to maintain a cooling state without controlling the temperature additionally for the user in a comfortable period state based on initial learning and continuous learning.

Particularly, in order to provide a comfort to the user without controlling an air conditioner manually, the air conditioner rapidly performs the cooling (or the heating) to the vicinity of the target temperate at the beginning of the operation of the air conditioner. When it reaches the vicinity of the target temperature, the air conditioner may determine whether to maintain the operation mode in the first period as itself or whether to consume a large amount of electrical power compared to the operation mode of the first period, or whether to consume less amount of electrical power, and the like, while maintaining the cooling or the heating. In one implementation, a load determination is performed.

The values inputted to the learning units 160 and 260 for the load determination are the parameters of the change in the time or the temperature, an initial value, a result value, or the magnitude thereof calculated in the above described first period.

In addition, the central control units 150 and 250 or a server control unit 350 of the cloud server 300 can detect a state of changing the temperature during the operation of the air conditioner according to an operation mode determined in a learning process. In this case, the nodes or the links of the hidden layers that form a deep learning of the learning units 160 and 360 may be reconfigured or the weights may be changed so that a more suitable operation mode can be determined.

On the other hand, in FIG. 9, when humidity sensed at an end time point of the first period is equal to or greater than a set reference, the central control units 150 and 250 can instruct the humidity control operation mode to the control units 190 and 290. For example, when the humidity is 60% or more, it is possible to add a dehumidification function depending on the operation mode of controlling the humidity instead of the comfortable operation mode.

When the humidity reaches the set reference or less (for example, 50% or less) and the state is maintained for certain time or more (for example, 5 minutes or more), the control unit may release the humidity control operation mode and enter a comfortable operation mode.

FIG. 10 shows a configuration of a learning algorithm included in a learning unit according to an implementation of the present disclosure. A node-based structure of the input factor, the hidden layer that forms the learning structure, and the output factor are an example of a design for a learning structure.

The factors that the parameter generating units 110 and 210 generate may be inputted to an input layer of the learning units 160 and 260. Five factors are provided, but various factors may be applied according to the implementation.

A plurality of hidden layers are arranged in the learning units 160 and 260. The learning units 160 and 260 can calculate a correlation between the inputted factors and an edge of each layer. For example, three hidden layers (hidden layer 1, hidden layer 2, and hidden layer 3) may be arranged as shown in FIG. 10.

For example, each of the nodes of the input layer has total of five input values. The value inputted to five input nodes can be converted in the input layer or outputted without conversion.

The values outputted from these input layers may be optionally the input values of 12 nodes in a first hidden layer (hidden layer 1). Similarly, the first hidden layer (hidden layer 1) may apply the weights of the links to the inputted value and calculate an output value according to logic of each node.

The values outputted from the first hidden layer may be optionally input values of eight nodes of the second hidden layer (hidden layer 2) again. Similarly, the second hidden layer (hidden layer 2) may apply the weights of the links to the inputted values and calculate the output values according to the logic of each node.

The value outputted from the second hidden layer may be optionally the input values of four nodes of the third hidden layer (hidden layer 3) again. Similarly, the third hidden layer (hidden layer 3) may apply the weights of the links to the inputted values and calculate the output values according to logic of each node.

Finally, an output node (output) can generate the degree of load as three nodes. In the case of the above described overload/standard load/small load, each value can be inputted to an output node expressed as over, an output node expressed as medium, and an output node expressed as under, respectively.

In one implementation, when the output node expressed as over is 1 and the output node expressed as medium is 0, and the output node expressed as under is 0, respectively, it is possible to instruct the operation mode as the overload. Meanwhile, when the output node expressed as over is 1 and the output node expressed as under is 1, and the output node expressed as medium is 0, it is possible to indicate the operation mode as the standard load. In the other implementation, when the output node expressed as over is 0 and the output node expressed as under is 1, and the output node expressed as medium is 0, it is possible to indicate the operation mode as the small load. Meanwhile, when the output node expressed as over is 0 and the output node expressed as under is 0, and the output node expressed as medium is 0, it is possible to indicate the operation mode as the standard load.

In FIG. 10, the links between the nodes of the respective layers are not shown. The link can be newly created or added in a learning process in which the learning units 160 and 260 adjust an algorithm or a component of the algorithm, and the weight assigned to each link can also be changed. Further, the number of hidden layers can be increased or decreased, and the number of nodes included in the hidden layers can also be increased or decreased.

For the hidden layers and the input factors of FIG. 10, an actual use (field) data in a great deal of households for extracting the input/output factor and chamber (experimental) data for a standard environmental test may be collected initially and the pre-learning is made based on the collected information, to set an initial weight value of the hidden layer. Then, through a cloud server, or when a control module 100 in the same indoor unit continuously collects actual use data, re-learning of entire data may be applied to periodically perform a weight update for each node and each link of a hidden layer.

In one implementation, it is possible to utilize clustering technique (unsupervised learning: k-means algorithm) in the classification of a load reference by collecting a DB for certain time when an air conditioner is actuated for determining an output factor.

Further, each hidden layer can use a general deep learning method. However, in another implementation, it is possible to change a structure of each hidden layer for learning or to update the weight. For example, a cloud server 300 may enable the information provided by the plurality of indoor units to be stored in DB and analyze the information stored in the DB to change the structure of the layers, the node, and the link of FIG. 9. Further, it is possible to sense that a user adjusts a temperature within certain time in a comfortable period state after setting a target temperature, and reflect the sensed temperature. In FIG. 13 to be described later, adjusting a wind speed, air volume, or a temperature, and the like, for the user may be included in the input node of the learning units 160 and 360 as an interrupt input.

Figure 11:
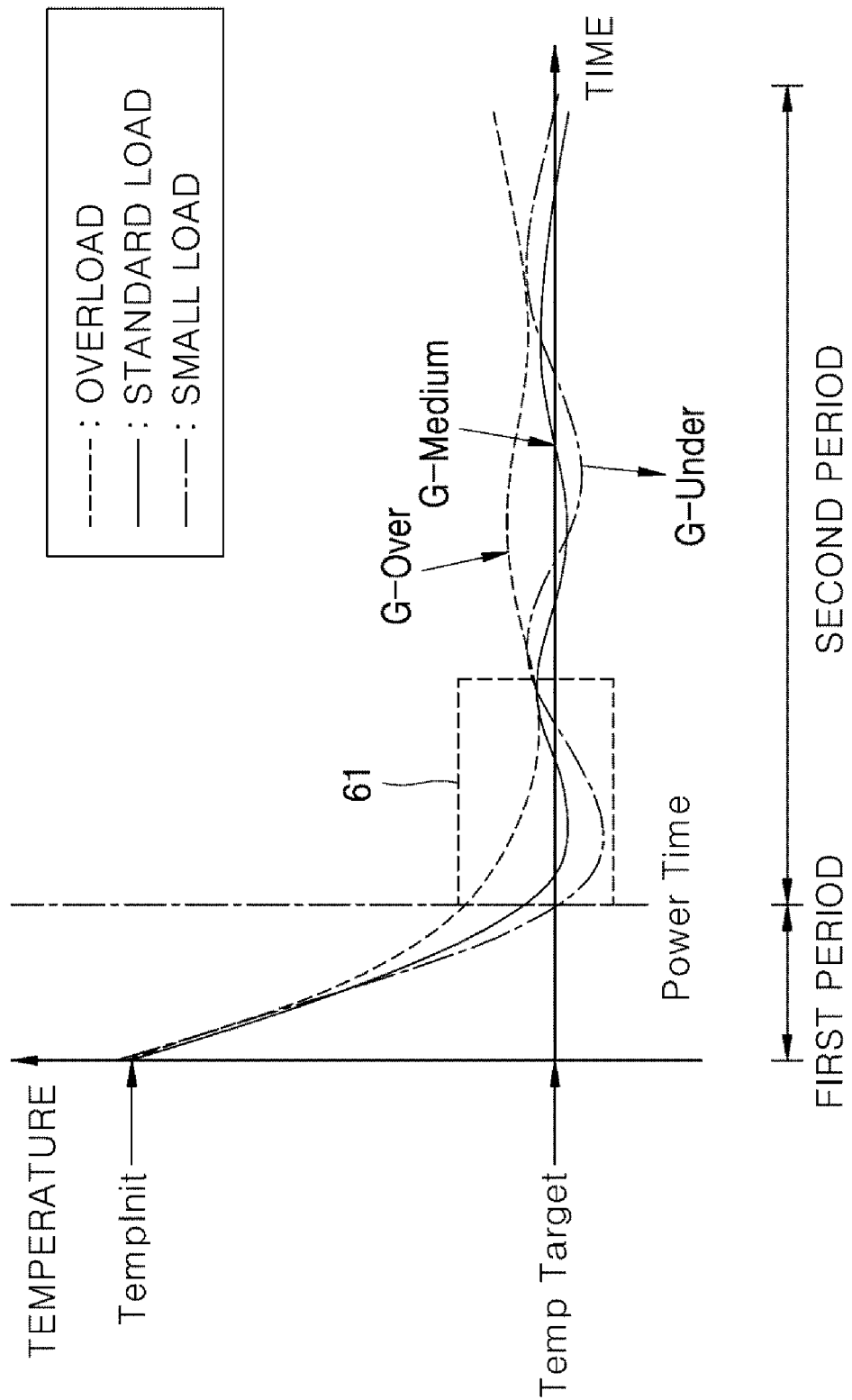
FIG. 11 shows a change in an operation mode when n implementation of the present disclosure is applied.

FIG. 11 shows a change in an operation mode when an implementation of the present disclosure is applied.

As shown in FIG. 9 in the above, when the air conditioner starts to operate, the parameter generating units 110 and 210 may continuously sense the temperature to calculate a graph as shown in FIG. 11. In this process, it is possible to obtain the learning factors. FIG. 11 shows the three different graphs. First, the graph in which an operation mode is calculated as the over-load mode is indicated by an dashes line (indicated by G-Over), and a graph in which the operation mode is calculated as the standard-load mode is indicated by a solid line (indicated by G-medium), and a graph in which the operation mode is calculated as the small-load mode is indicated by an alternate long and short dash line (indicated by G-Under).

In a first period, a compressor sharply reduces a temperature within a short period of time with a maximum output or high output. In one implementation, the first period is a rapid period. A Powertime is a time point at which the temperature of the air conditioner reaches a target temperature (TempTarget) or the temperature of the air conditioner reaches a target temperature with a constant temperature difference depending on a state of space. Until the time point, the parameter generating units 110 and 210 may generate various parameters and provide the generated parameters to the learning units 160 and 360. The learning units 160 and 360 may determine an operation mode by using the parameters provided at a time point "Powertime". The learning units 160 and 360 can analyze a change pattern according to cooling in the first period at the time point expressed as "61". An air conditioner in a second period can select an operation mode that reduces electrical power consumption as well as providing a comfort to the user.

When the temperature of the air conditioner does not sufficiently reach the target temperature in the first period according to the change pattern or a lot of time is consumed to reach the temperature, or an overload operation mode is determined by the learning units 160 and 360 by reflecting a change rate during the initial N minutes, and the like, the air conditioner can be operated for the second period according to a control pattern preset for the overload mode as indicated by G-over in the graph.

When the temperature of the air conditioner sufficiently reaches the target temperature in the first period according to the change pattern or the time to reach the temperature is consumed in response to a reference value, or a standard load operation mode is determined by the learning units 160 and 360 so as to maintain a current temperature or the target temperature by reflecting a change rate for initial N minutes, the air conditioner can be operated for the second period according to a control pattern preset for the standard load mode as indicated by G-medium in the graph.

When the temperature of the air conditioner reaches the lower temperature than the target temperature or less time is consumed to reach the temperature in the first period according to the change pattern, or a small load operation mode is determined by the learning units 160 and 360 by reflecting a change rate for initial N minutes, and the like, the air conditioner can be operated for the second period according to a control pattern preset for the small load mode as indicated by G-Under in the graph.

Even if the target temperatures are the same, the air conditioner can operate differently when the temperature change patterns until the temperature of the air conditioner reaches the target temperature are different. That is, the temperature change patterns after the target temperature is reached are based on the different results of a learning process due to the difference values of the learning factors input to the learning process, and thereby it is possible to perform operation modes for appropriately performing cooling more or less in response to the load conditions of a target indoor space.

Conventionally, if the cooling (or the heating) is performed in the first period in the same manner in spite of different indoor load conditions, a weak cooling (or weak heating) or the super-cooling (or super-heating) occurs depending on the load conditions. However, by the implementations of the present disclosure being applied, it is possible to cool (or heat) in the second period in a manner appropriate for each of different indoor load condition, so that it is possible to maintain a comfortable indoor environment as well as reducing energy consumption for the second period.

Figure 12:
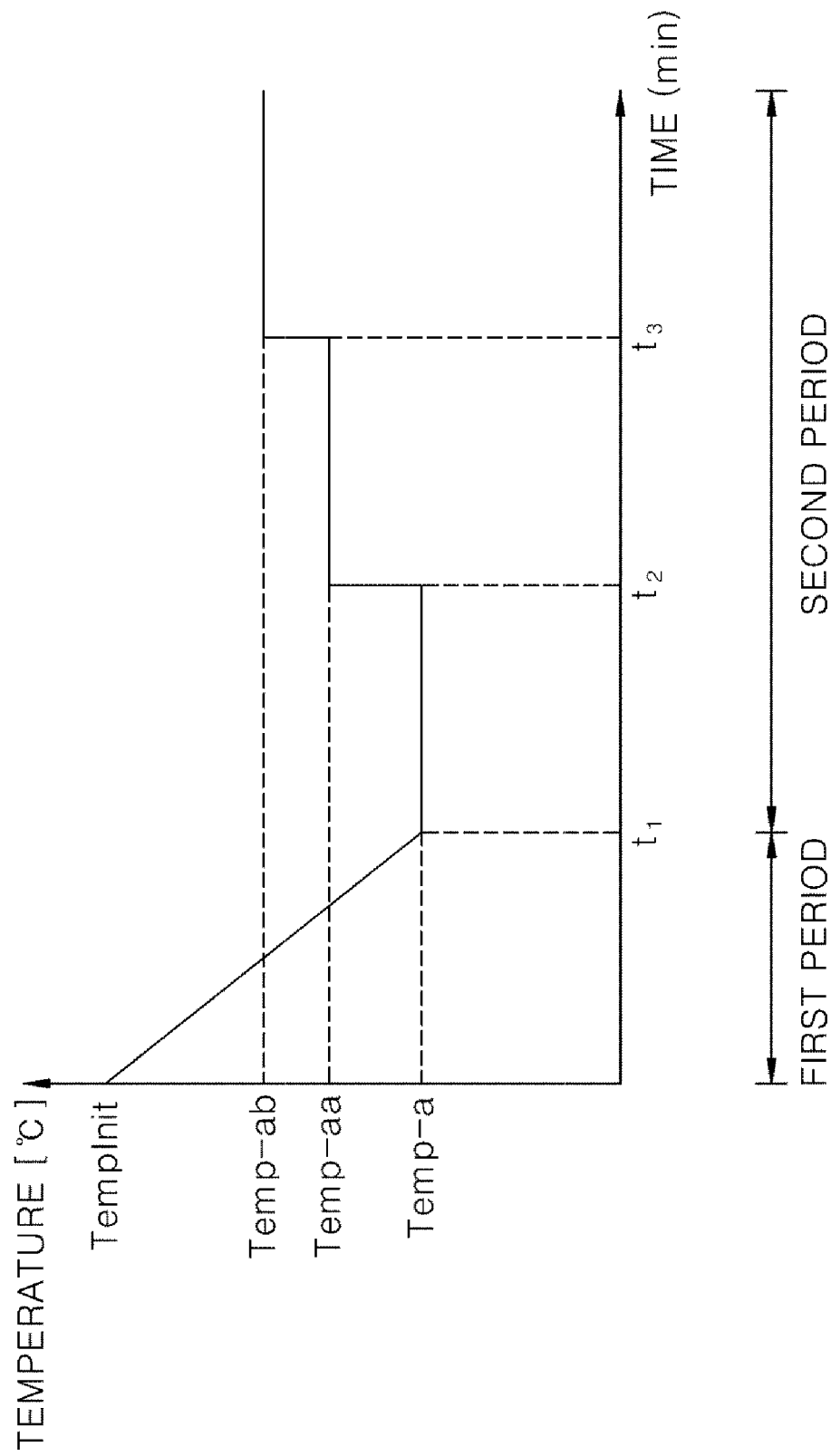
FIG. 12 shows a process in which an operation mode control unit controls an operation mode according to a load step according to an implementation of the present disclosure.

FIG. 12 shows that an operation mode control unit controls an operation mode according to an implementation of the present disclosure. In an implementation, the case where a small load is determined will be described. An air conditioner operates in a rapid mode so that the temperature of the air conditioner reaches a target temperature from an initial temperature (TempInit). In FIG. 12, in a time domain indicated by a first period, the air conditioner can operate in the rapid mode as it is in a state before reaching a target set temperature. In this case, the air conditioner can operate in a cool power mode by using a maximum cooling power of the air conditioner. In this process, the air conditioner may sense the human body or sense a space area to lower a temperature in space more efficiently.

On the other hand, as a time domain indicated by a second period is in a state after reaching a target set temperature, an air conditioner can operate in a comfortable mode. According to an implementation of the present disclosure, a learning unit 160 of a control module or a learning unit 360 of a cloud server may determine an operation mode by using a learning factor that the parameter generating units 110 and 210 generate at a time point t1. That is, in the second period, the load required for the air conditioner to operate is determined. As a result of a determination, in FIG. 12, the air conditioner is operated by determining the operation mode as a small load. In the second period after the rapid mode in the first period, the operation mode control units 190 and 290 can control an indoor unit and an outdoor unit, and the like, so as to lower the human body adaptation time and raise a temperature, and lower air volume.

By controlling a small load by the operation mode control units 190 and 290, a temperature rises to some extent as Temp-aa at a time point t2 from a state of the target temperature Temp-a at the t1 point, and a temperature rises as Temp-ab again at a time point t3 to maintain the temperature to Temp-ab. In one implementation, the target temperature is automatically set to the temperature that a user generally uses, and may be a temperature that the user sets recently at most for N times (for example, 20 times). Alternatively, a temperature preferred by an external server based on big data in response to a current temperature may be set as a target temperature.

At time point 't1', it is possible to set a cooling capacity after time point t1 based on various parameters generated to reach the target temperature. For example, it is possible to set whether to provide the cooling capacity corresponding to an overload condition, or to provide the cooling capacity corresponding a standard load condition, or to provide the cooling capacity corresponding to a small load condition, based on previously learned information and the generated parameter. Thereafter, it may operate in a power saving operation mode by gradually adjusting the cooling capacity between steps t2 and t3. When humidity is high in this process, it is possible to adjust the humidity to target humidity according to an additional process of controlling the humidity. It is also possible to calculate time points t2 and t3 that raise the temperature according to a pattern of the user.

Although it is not shown in the drawing, when the operation mode is determined as the standard load, it is possible to raise a temperature and to convert air volume into a weak wind by reflecting the human body adaptation time with a standard condition. Further, when the operation mode is determined as the overload, it is possible to enhance an air volume without raising a temperature depending on the human body adaptation condition.

According to one implementation, it is possible to determine an overload mode/a standard load mode/a small load mode as an operation type of a comfortable operation mode based on the information determined in a process of operating in a rapid operation mode. When the operation mode of the comfortable operation mode is the overload mode, the operation mode control units 190 and 290 can control the air conditioner in a manner of reducing or maintaining the air volume by controlling the air volume as moderate wind or mild wind.

On the other hand, when an operation mode of the comfortable operation mode is the small load mode or the standard load mode, the operation mode control units 190 and 290 can control the air conditioner in such a manner of controlling air volume as the mild wind to reduce the air volume.

Further, in the operation mode of the comfortable operation mode, the operation mode control units 190 and 290 send the wind to many areas by setting a wind direction of a blowing unit 15 upward.

For example, the operation modes before/after reaching the target temperature may be classified into a first operation mode of operating with a maximum capacity of the air conditioner until the temperature reaches to the target temperature and a second operation mode of operating according to the load determined at the time point t1 when the target temperature is reached. It is possible to provide various operation modes through the temperature and air volume change for power saving according to a load step estimated at time point 't1' or a comfortable cooling.

A starting temperature in which the air conditioner starts to operate and a target temperature, and the variables in various environments that occur between the starting temperature and the target temperature are extracted as a learning factor. The air conditioner may change the operation of the air conditioner to the comfortable mode after the rapid mode that uses the maximum cooling power. In this process, the user can control the operation of the air conditioner by selecting an appropriate load so as not to feel the temperature warming up for the user.

Further, when an external operation (such as increasing or decreasing a temperature or controlling air volume) occurs that controls the operation of the air conditioner in the process of determining the load using various environmental factors and operating in a comfortable mode, it is possible to more accurately estimate the load by inputting the external operation to the learning units 160 and 360 so as to be new result node.

It will be summarized below. In one implementation, the cooling air conditioner maintains a temperature at the time point when the rapid operation mode is terminated in period t1-t2 based on the end time point t1 of the rapid operation mode. Then, in a period t2-t3 after the period t1-t2, a temperature is increased compared to the period t1-t2 with a stepwise change rate. In one implementation, in a heating air conditioner, after maintaining the temperature in the period t1-t2 based on the end point t1 of the rapid operation mode, in the period t2-t3 after the period t1-t2, it may reduce the temperature compared to the period t1-t2 with the stepwise change rate. Here, in one implementation, the stepwise change rate means that a temperature changes slowly or a temperature raises in a stepwise as shown in FIG. 12. The air conditioner can operate so that a temperature changes in a straight line or a broken line or a curved line at a Temp-a point at time point t1, Temp-aa point at time point t2, and Temp-ab point at time point t3.

The time intervals of t1-t2 and t2-t3 can also be increased or decreased. For example, the interface units 140 and 240 may receive a control signal that increases or decreases a temperature in the period t1-t2 during the operation of the air conditioner. For example, the user changes the temperature in the period t1-t2. The central control units 150 and 250 may increase a temporal length of the period t1-t2 when a control signal that lowers a temperature is received. For example, the time can be increased by 1 minute. On the contrary, the central control units 150 and 250 can reduce the temporal length of the period t1-t2 when the control signal that increases the temperature is received. For example, the time can be reduced by 1 minute. This is also identically applicable to the case where a control signal is received in the period t2-t3. As a result, it is possible to increase or decrease the interval between the two time points at which the control signal is generated, such as t1-t2 or t2-t3 in an inverse proportional to the increase or the decrease of the temperature, in response to the control signal that increases or decreases the temperature in the comfortable operation mode.

Further, according to the implementation of the present disclosure, the control units 150 and 250 can store position information on a residing area that an occupant is repeatedly confirmed in a space where the air conditioner is installed. That is, information on an area where a person is mainly sensed or a person is frequently in the entire space where wind of the air conditioner is transmitted may be stored as positional information on the residing area, and the residing area may be concentrated as a subject in the rapid operation mode, so that the air conditioner can operate. For this purpose, the left and right wind direction of the blowing unit 15 in the rapid operation mode can be set based on the residing area. Then, in the comfortable mode, based on the positional information that the control units 150 and 250 store, for example, positional information on a activity area that the occupant is intermittently identified including the residing area, the left and right wind direction of the blowing unit 15 can be set based on the activity area in the comfortable operation mode. In the rapid operation mode, a specific area (the residing area) stored in the control units 150 and 250 may be blown in concentration thereon, and in the comfortable operation mode, it may blow in concentration on a wider area (a activity area) including the residing area to improve energy efficiency.

In order for the control units 150 and 250 to distinguish the residing area from the activity area, the air conditioner may use a camera that acquires an external image, and recognize an area where an occupant is disposed in an indoor space including a plurality of areas from the image that the camera acquires, and include artificial neural network that pre-learns the result of recognizing a position of the occupant by machine learning and divide the areas into the residing area that blows in concentration on a plurality of areas with an input of data to the artificial neural network and the activity area including the residing area. With respect to the information, positional information (left/right and distance information on an air conditioner) may be provided from an external server.

As shown in FIG. 12, operation mode information that the learning unit determines with respect to the second period may include time information (t2 and t3) and temperature information (Temp-ab and Temp-aa).

FIG. 13 shows a configuration of a learning unit according to an implementation of the present disclosure. The configuration of the learning units 160 and 360 of FIG. 3 or FIG. 4 in the above will be described.

The learning units 160 and 360 may include an input layer (input) having N number of parameters as the input nodes, an output layer (output) having operation mode information as an output node, and one or more of M number of hidden layers arranged between the input layer and the output layer. In an implementation, the parameter may be the factors described in FIG. 5 or FIG. 6 in the above, but is not limited thereto.

Here, the weight may be set at an edge connecting the two nodes of the layers, and the presence or absence of the weight or the edge can be added or removed or updated during learning. Thus, the weights of the nodes and the edges arranged between k number of input nodes and i number of output nodes can be updated in the learning process or by an interrupt input. As shown in FIG. 13, i number of output nodes may be arranged so as to output the value such as 1/0 or probability for each mode. Alternatively, as the output node, a node that outputs an element (+, −, or +10% or −20%) that has to be relatively changed in an operation mode in a first period may be arranged. Alternatively, t2, t3 or Temp-aa, Temp-ab, and the like, described in FIG. 12 may also form the output node.

All nodes and edges may be set to an initial value before the learning units 160 and 360 perform the learning. However, when the information is accumulatively inputted, the weights of the nodes and edges in FIG. 13 may be changed, and a matching of the parameters generated in the first period and operation mode information suitable for a second period can be made. In particular, when a cloud server 300 is used, as the learning unit 360 can receive many parameters, the learning unit 360 can perform learning based on a large amount of data.

An interrupt input means information on the changed wind speed or temperature by a user, after operation mode information on a second period is outputted. Thus, after k number of parameters are inputted in the first period and the operation mode information on the second period is generated, and then, when the interrupt input is received again, a predetermined value may be inputted to an distinct node (Interrupt P) to generated new operation mode information or update the learning units 160 and 360.

In summary, the weights of the nodes and the edges between the input node and the output node included in the learning units 160 and 360 of FIG. 13 can be updated in the learning process of the learning units 160 and 360 or the interrupt input of a central control unit.

FIG. 14 shows an exemplary configuration of a learning unit according to an implementation of the present disclosure. The learning units 160 and 360 include five input units, three hidden layers, and three output units. A first hidden layer includes 20 units, and a second hidden layer includes 13 units, and a third hidden layer includes 5 units. A link may always be arranged between the two nodes and it is possible to set the weight of the link.

The inputted values may be an indoor initial temperature, a target set temperature, initial N minutes (for example, 3 minutes), a temperature difference, a temperature difference in the rapid period, and a time to reach the target temperature. These five input values may be combined to map as 20 units. The bias and the weight of the link needed for the mapping may be continuously learned at an initially set value, and the values may be changed during learning.

Similarly, 20 units are mapped as 13 units of the second hidden layer and 13 units of the second hidden layer are mapped as 5 units of the third layer again. Five final units are connected to 3 output units, and each output unit represents a load degree. That is, each output unit may be determined as any one, which can be connected to a standard load, an overload, and a small load. Of course, according to the implementation method, the output unit may be one, and it is possible to determine the load degree by having an outputted value as 0, 1, and 2.

The link between the two layers or the weight and the bias applied to the links can be continuously changed during learning. Alternatively, the information on these learning units 160 and 360 may be updated externally to set the weight and the bias.

In one implementation, in comparison of an input unit with a unit of the first hidden layer, as the weight value of the node of 20 hidden layers is set for each inputted node, 100 weights may be generated for 5 input nodes in total. Further, since a bias value which is added for addition after the multiplication with the weight value is calculated, a total of 20 bias values can be generated. Alternatively, the bias value can also be set for each weight.

When the weights and the bias of the respective links of the learning units 160 and 360 are determined, and the five parameters are inputted to the learning units 160 and 360, the values of 0, 1, or 2 are finally calculated. The calculated value may be provided to the air conditioner as operation mode information that sets a load in a comfortable mode of an air conditioner.

The set of weights applied to the links arranged from the input to the first hidden layer is $\{w1\_1, w1\_2, \ldots, w1\_i\}$ and the set of bias is $\{b1\_1, b1\_2, \ldots, b1\_20\}$. Here, i may have a value of 20 or more and 100 (5×20) or less. In FIG. 14, the link may be arranged between the input node and all nodes of the first hidden layer, and 'i' may have a value of 100. The values of twenty units of the first hidden layer may be inputted by applying $\{w1\_1, w1\_2, \ldots, w1\_100\}$ and $\{b1\_1, b1\_2, \ldots, b1\_20\}$ to five inputted factors.

The set of weights applied to the links arranged from the first hidden layer to the second hidden layer is $\{w2\_1, w2\_2, \ldots, w2\_j\}$, and the set of bias is $\{b2\_1, b2\_2, \ldots, b2\_3\}$. Here, j can have a value of 20 or more and 260 (20×13) or less. In FIG. 14, a link may be arranged between the two nodes between the first hidden layer and the second hidden layer, and j has a value of 260. $\{w2\_1, w2\_2, \ldots, w2\_260\}$ and $\{b2\_1, b2\_2, \ldots, b2\_13\}$ are applied to the values of 20 units of the first hidden layer and inputted to the values of thirteen units of the second hidden layer.

The set of weights applied to the links arranged from the second hidden layer to the third hidden layer is $\{w3\_1, w3\_2, \ldots, w3\_k\}$, and the set of bias is $\{b3\_1, b3\_2, \ldots, b3\_5\}$. Here, k can have a value of at least 13 or more and 65 (5×13) or less. In FIG. 14, a link may be arranged between the two nodes between the second hidden layer and the third hidden layer so that k has a value of 65. $\{w3\_1, w3\_2, \ldots, w3\_65\}$ and $\{b3\_1, b3\_2, \ldots, b3\_5\}$ may be applied to the values of thirteen units of the second hidden layer and inputted into the values of five units of the third hidden layer.

The set of weights applied to the link arranged from the third hidden layer to the output may be $\{w4\_1, w4\_2, \ldots, w4\_p\}$, and the set of bias may be $\{b4\_1, b4\_2, \ldots, b4\_3\}$. Here, p can have a value of at least 5 or more and 15 (5×3) or less. In FIG. 14, a link may be arranged between the two nodes between the third hidden layer and the output, and p may have a value of 15. $\{w4\_1, w4\_2, \ldots, w4\_p\}$ and $\{b4\_1, b4\_2, \ldots, b4\_3\}$ are applied to the values of five units of the third hidden layer and are connected to three output units to determine the load degree.

Figure 15:
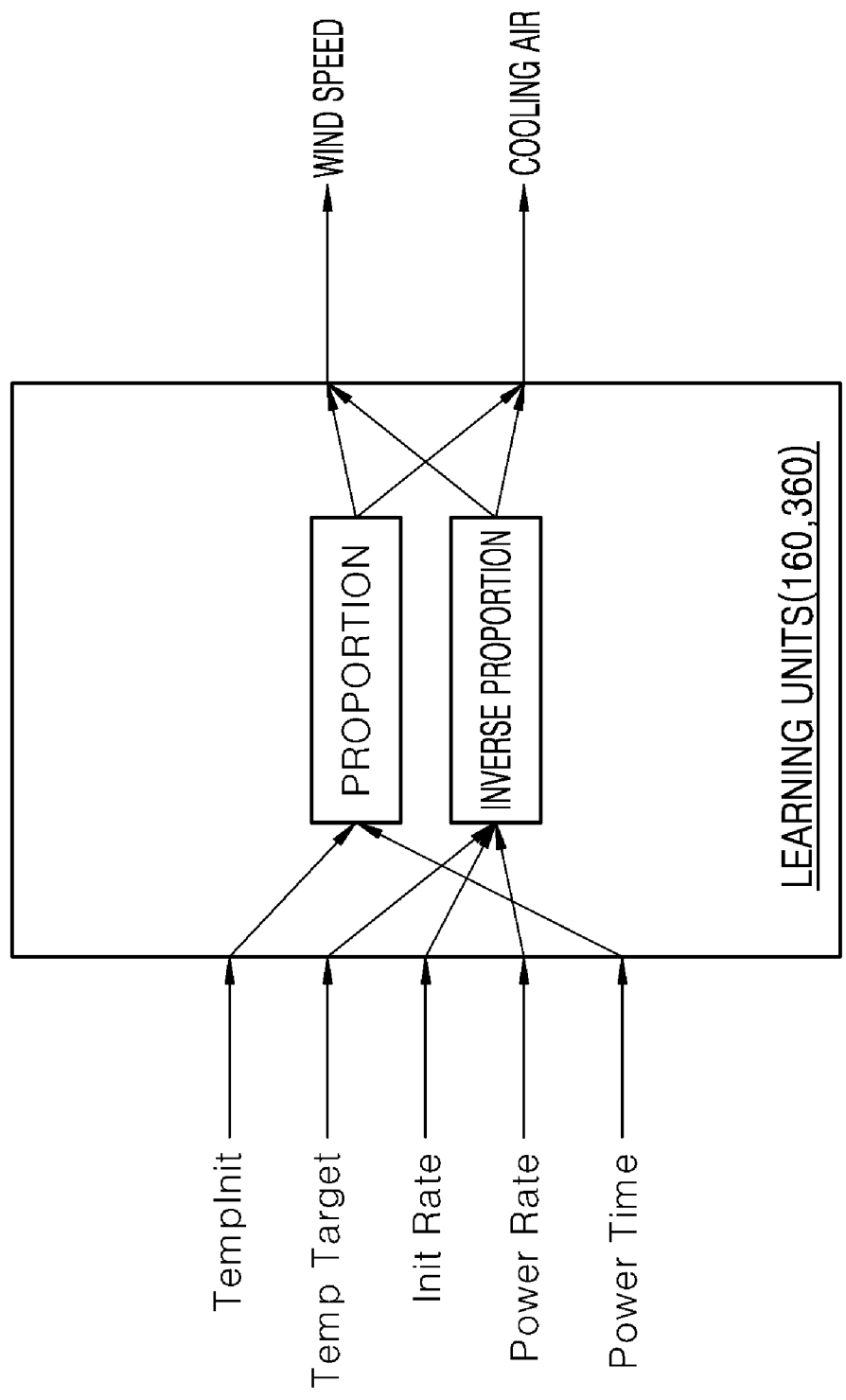
FIG. 15 shows an interaction of the parameters of an air conditioner that discharges cooling; air and a provision of a wind direction and cooling air according to an implementation of the present disclosure.

FIG. 15 shows an interaction of the parameters of an air conditioner that discharges cooling air and a provision of a wind speed and cooling air according to an implementation of the present disclosure. In a first period to discharge the cooling air, the learning units 160 and 360 can increase a wind speed in the following cases or an outdoor unit can increase cooling air. In a state of i) proportional to an indoor initial temperature (TempInit) or ii) inversely proportional to a target set temperature (TempTarget), or iii) inversely proportional to a temperature change rate (InitRate) in an initial time interval, or iv) inversely proportional to a temperature change rate (PowerRate) in a first period, or v) proportional to a time magnitude (PowerTime), the learning units 160 and 360 can output operation mode information that increases wind speed or controls an outdoor unit to increase cooling air and provide it.

Accordingly, when the learning units 160 and 360 may include one or more hidden layers, one or more edges and nodes that have high weight or the proportional weight is set between wind speed, air volume, or cooling air and TempInit/PowerTime can be arranged. A quadrangle expressed as "proportional" may shape such an edge and a node.

Figure 16:
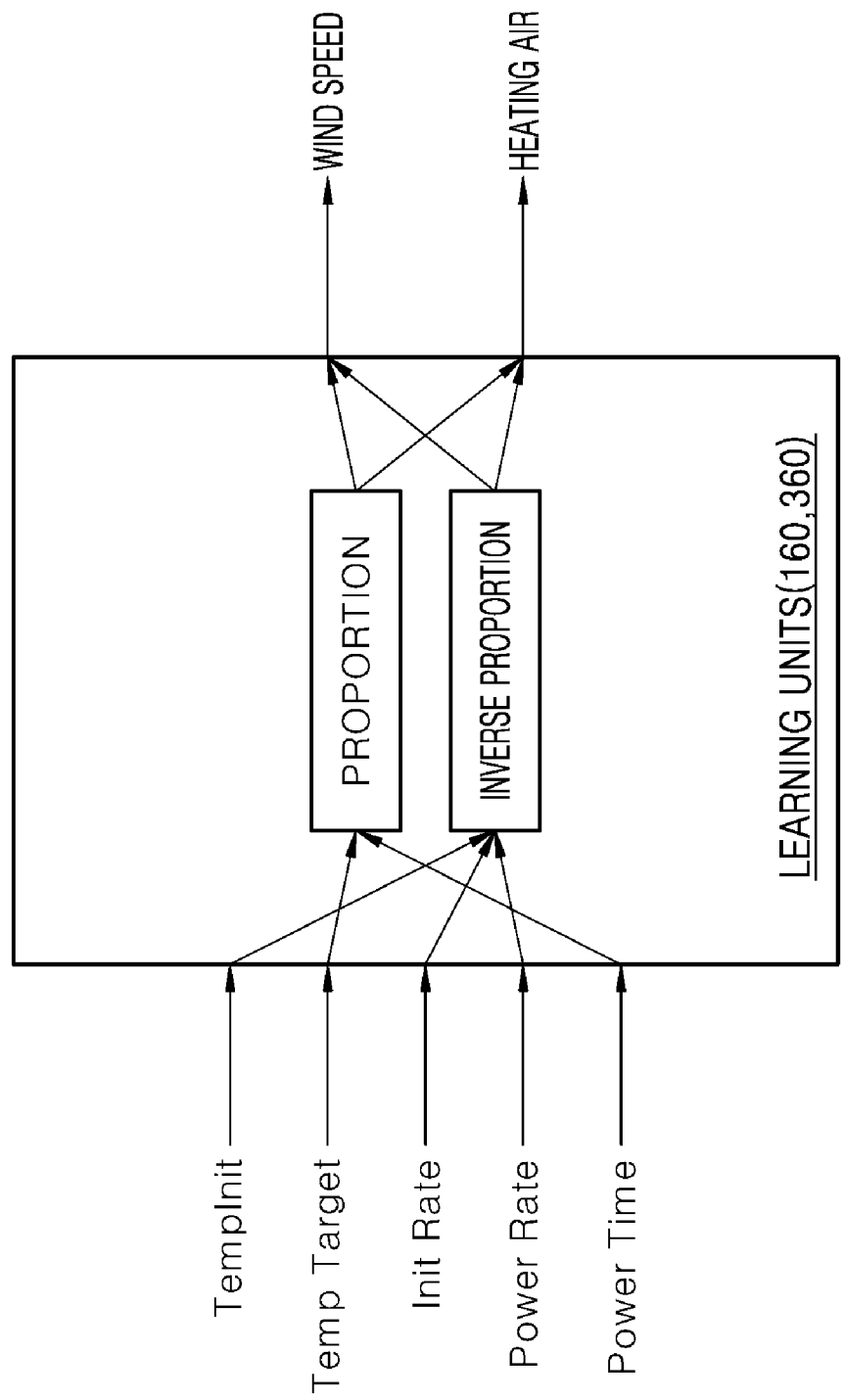
FIG. 16 shows an interaction between the parameters of an air conditioner that discharges heating air and a provision of a wind speed and heating air according to another implementation of the present disclosure.

On the other hand, one or more edges and nodes that have the low weight or the inverse proportional weight is set may be arranged between the wind speed, the air volume, or the cooling air and TempTarget/InitRate/PowerRate. A quadrangle expressed as "inverse proportional" may shape such an edge and a node. FIG. 16 shows the interaction of the parameters of air conditioner that discharges heating air and a provision of heating air and the wind speed in accordance with another implementation of the present disclosure.

The learning units 160 and 360 can increase a wind speed or an outdoor unit can increase heating air in a first period that discharges the heating air in the following cases. In the state of i) inverse proportional to an indoor initial temperature (TempInit), or ii) proportional to a target set temperature (TempTarget), or iii) inverse proportional to a temperature change rate (InitRate) in an initial time interval, or iv) inverse proportional to a temperature change rate (PowerRate) in a first period, or v) proportional to a time magnitude (PowerTime), the learning units 160 and 360 can output operation mode information that increases wind speed or controls an outdoor unit to increase cooling air and provide it.

Thus, the learning units 160 and 360 are made of one or more hidden layers, one or more of edges and nodes that have the high weight or proportional weight is set may be arranged between a wind speed, air volume, cooling air, and TempTarget/PowerTime. A quadrangle indicated by "proportional" may shape such an edge and a node.

On the other hand, one or more of edges and nodes that have the low weight and inversely proportional weight is set may be arranged between the wind speed, air volume, or cooling air and TempInit/InitRate/PowerRate. A quadrangle indicated by "inversely proportional" may shape such an edge and a node.

The proportion/inverse proportion and the parameters shown in FIG. 15 and FIG. 16 are merely the implementation and can be selected in various ways.

As shown in FIGS. 13 to 16, the learning units 160 and 360 may receive one or more parameters as a learning factor, and when the learning factors are different, the outputted operation mode information may be different. For example, when the first learning factor inputted at the first time point and the second learning factor inputted at the second time point after the first time point are different from each other, the learning units 160 and 360 may obtain the second operation mode information different from the first operation mode information outputted at the first time point so that the operation mode information on the second period is outputted differently in the first time point and the second time point. As a result, the operation mode information on the second period at the first time point and the operation mode information on the second period at the second time point can be different from each other.

According to implementations of the present disclosure being applied, it is possible to provide a method of estimating learning based load for the efficient cooling or heating control of the air conditioner and an apparatus applying such method. Particularly, according to the implementations of the present disclosure, the correlation between an environmental factor before/after the two points of reaching the target set temperature and a temperature pattern according to cooling (or heating) is learned to estimate load in a stepwise so that an efficient cooling operation is possible after reaching a target temperature. Thus, even if the same target temperature is set, various environmental factors until the temperature reaches the target temperature may be an element that differently controls an operation of the air conditioner after reaching the target temperature.

When the implementations of the present disclosure are applied, the air conditioner may have the parameter generated during operation as the learning factor to determine the operation mode with respect thereto.

When the implementations of the present disclosure are applied, the cloud server can determine the operation mode suitable for each air conditioner after learning based on the parameters that the plurality of air conditioners determine and provide in the operation process.

When the implementations of the present disclosure are applied, after the air conditioner is operated to reach the predetermined target temperature, it is possible to maintain the target temperature within the predetermined range based on a small amount of consumption electrical power per unit time.

In the implementation of the present disclosure, a consumption electrical power per unit time of the second period (the comfortable mode) is less than a consumption electrical power per unit time of the first period (the rapid mode). In the first period, the electrical power is used at most for rapid cooling/heating initially, and the time is short. On the other hand, in the second period, a level of the cooling/heating provided in the first period is maintained and the time is long. Therefore, the consumption electrical power per unit time of the first period is greater than the consumption electrical power per unit time of the second period. Of course, the temporal magnitude in the first period may also be less than the temporal magnitude in the second period. For example, the first period may be set not to exceed a maximum of 10 minutes, but the second period may be maintained for a longer period of 3 hours or 5 hours.

The second period may be stopped at a time point at which the indoor unit stops providing the cooling or heating function, for example, at a time point at which the user changes an operation additionally such as converting the mode or turning off a power, and the like. Therefore, the electrical power consumption at the beginning of the second period may be equal to or greater than the electrical power consumption in the first period. However, when an average consumption electrical power per unit time (K2) is calculated based on the total time of the second period, it satisfies K2<K1, in comparison with an average consumption electrical power per unit time (K1) used in the first period.

Although components included in the implementation of the present disclosure are described as being combined to one, or as being operated to operate, the present disclosure is not necessarily limited to such an implementation, and these components may operate by being selectively combined to one or more within the purpose range of the present disclosure. Further, although all of the components may be implemented as an independent hardware, a part or all of each of the components may be selectively combined to be implemented as a computer program that has a program module that performs a part or all of the function combined in one or a plurality of hardwares. The codes and the code segments that form the computer program will be easily deduced by those skilled in the art of the present disclosure. Such a computer program can be stored in a computer readable media that a computer can read, and can be read and implemented by the computer to implement the implementation of the present disclosure. As the storage medium of the computer program, it may include a storage media including a semiconductor recording element, an optical recording media, and a magnetic recording media. Further, a computer program that implements the implementation of the present disclosure may include a program module that is transmitted in real time via an external apparatus.

What is claimed:

1. An air conditioner, comprising:
   at least one processor; and
   at least one computer memory operably connectable to the at least one processor and storing instructions that, when executed by the at least one processor, perform operations comprising:
   generating at least one parameter in a first operation mode of the air conditioner, wherein the first operation mode is operated only within a preset time range;
   controlling, based on operation mode information including at least one result factor that is obtained from at least one machine-learning network, at least one of (i) a wind direction and an air volume of discharged air, or (ii) supply of compressed refrigerant for exchanging heat with air in the air conditioner; and
   performing, based on the generated at least one parameter, an operation of switching to a second operation mode after a time period of operation in the first operation mode,
   wherein an absolute value of a first temperature change rate during the first operation mode is greater than an absolute value of a second temperature change rate during the second operation mode,
   wherein the air conditioner is configured to change a room temperature in a stepwise change rate after the first operation mode is terminated, wherein, (i) based on a difference between a current temperature and a target set temperature being within a temperature band or (ii) based on the difference being maintained for a time period in the second operation mode, the operations further comprise performing an operation to switch to the first operation mode, and wherein the target set temperature is automatically set to a temperature that is determined by an external server based on big data in response to the current temperature.

2. The air conditioner of claim 1, wherein the air conditioner is configured to communicate with a cloud server, wherein the at least one result factor obtained from the at least one machine-learning network is obtained from at least one of (i) the cloud server after the air conditioner transmits the at least one parameter to the cloud server, or (ii) an embedded learning unit.

3. The air conditioner of claim 1, wherein the operations further comprise:

based on the air conditioner operating for cooling, maintaining a temperature during a first time interval from a time point when the first operation mode ends, and subsequently increasing the temperature compared to the temperature of the first time interval during a second time interval; and based on the air conditioner operating for heating, maintaining a temperature during a first time interval from a time point when the first operation mode ends, and subsequently reducing the temperature compared to the temperature of the first time interval during a second time interval, wherein the first time interval and the second time interval form a time interval of the second operation mode.

4. The air conditioner of claim 3, wherein the operations further comprise:

receiving, through an interface unit, a control signal related to an increase or a decrease in a temperature of the air conditioner, wherein, based on the air conditioner operating for cooling in the second operation mode, increasing or decreasing a length of the first time interval or the second time interval in inverse proportion to the increase or the decrease of the temperature by the control signal.

5. The air conditioner of claim 1, wherein the operations further comprise:

performing a humidity control operation mode based on a humidity level, which is sensed at a time of switching from the second operation mode to the humidity control operation mode, exceeding a first reference threshold criteria, and releasing the humidity control operation mode based on the humidity level reaching a second reference threshold criteria and being maintained for a period of time.

6. The air conditioner of claim 1, wherein the operations further comprise:

storing position information related to a residing area, based on an occupant repeatedly being detected in a space where the air conditioner is installed; and setting a left or right wind direction in the first operation mode to be directed to the residing area.

7. The air conditioner of claim 6, wherein the operations further comprise:

storing position information related to an activity area that the residing area, based on the occupant being intermittently detected; and setting the left or right wind direction in the second operation mode to the activity area.

8. The air conditioner of claim 1, wherein the operations further comprise:

based on (i) the air conditioner starting to operate and a difference between a current indoor temperature and the target set temperature being greater than a predefined value, or (ii) the air conditioner receiving an input signal that instructs a driving of the first operation mode:

performing an operation of switching to the first operation mode.

9. The air conditioner of claim 1, wherein the at least one parameter comprises: (i) an indoor initial temperature related to a time at which the first operation mode is started, (ii) a target set temperature for the first operation mode, (iii) a temperature change rate during an initial time interval of the first operation mode, (iv) a temperature change rate during the first operation mode, and (v) a time difference between a start time and an end time of the first operation mode.

10. The air conditioner of claim 6, wherein the at least one machine-learning network comprises:

at least one input layer that has the at least one parameter as at least one input node;

at least one output layer that has the operation mode information as at least one output node; and at least one hidden layer arranged between the at least one input layer and the at least one output layer, wherein weights of at least one node and at least one edge between the at least one input node and the at least one output node are updated by a learning process of the at least one machine-learning network.

11. A method of controlling an air conditioner based on machine-learning, the method comprising:

discharging air in a first operation mode of the air conditioner within a preset time range, wherein the first operation mode is operated only within a preset time range;

generating at least one parameter in the first operation mode of the air conditioner;

controlling, based on operation mode information including at least one result factor that is obtained from at least one machine-learning network, at least one of (i) a wind direction and an air volume of discharged air, or (ii) supply of compressed refrigerant for exchanging heat with air in the air conditioner; and performing, based on the generated at least one parameter, an operation of switching to a second operation mode after a time period of operation in the first operation mode, wherein an absolute value of a first temperature change rate during the first operation mode is greater than an absolute value of a second temperature change rate during the second operation mode, wherein the air conditioner is configured to change a room temperature in a stepwise change rate after the first operation mode is terminated, wherein, (i) based on a difference between a current temperature and a target set temperature being within a temperature band or (ii) based on the difference being maintained for a time period in the second operation mode, the operations further comprise performing an operation to switch to the first operation mode, and wherein the target set temperature is automatically set to a temperature that is determined by an external server based on big data in response to the current temperature.

12. The method of claim 11, further comprising:
based on the air conditioner operating for cooling, maintaining a temperature during a first time interval from a time point when the first operation mode ends, and subsequently increasing the temperature compared to the temperature of the first time interval during a second time interval; and
based on the air conditioner operating for heating, maintaining a temperature during a first time interval from a time point when the first operation mode ends, and subsequently reducing the temperature compared to the temperature of the first time interval during a second time interval,
wherein the first time interval and the second time interval form a time interval of the second operation mode.

13. The method of claim 12, wherein the at least one parameter comprises (i) an indoor initial temperature related to a time at which the first operation mode is started, (ii) a target set temperature for the first operation mode, (iii) a temperature change rate during an initial time interval of the first operation mode, (iv) a temperature change rate during the first operation mode, and (v) a time difference between a start time and an end time of the first operation mode.

14. The method of claim 11, further comprising:
performing a humidity control operation mode based on a humidity level, which is sensed at a time of switching from the first operation mode to the second operation mode, exceeding a first reference threshold criteria, and
releasing the humidity control operation mode based on the humidity level reaching a second reference threshold criteria and being maintained for a period of time.

15. A cloud server, comprising:
at least one processor; and
at least one computer memory operably connectable to the at least one processor and storing instructions that, when executed by the at least one processor, perform operations comprising:
receiving, from each of plurality of air conditioners, at least one parameter generated in a first operation mode of respective air conditioner, wherein the at least one parameter is related to at least one temperature individually set in the respective air conditioner;
for each of the plurality of air conditioners, using at least one machine-learning network to process the at least one parameter received from the respective air conditioner, and generating, through a learning process, operation mode information for the respective air conditioner; and
transmitting, to each of the plurality of air conditioners, the operation mode information for the respective air conditioner,
wherein the cloud server communicates with the plurality of air conditioners,
wherein the operation mode information comprises data to set a second operation mode of the respective air conditioner after a period of time of operating in the first operation mode based on the received at least one parameter,
wherein an absolute value of a first temperature change rate during the first operation mode is greater than an absolute value of a second temperature change rate during the second operation mode of the respective air conditioner,
wherein the respective air conditioner is configured to change a room temperature in a stepwise change rate after the first operation mode is terminated,
wherein, (i) based on a difference between a current temperature and a target set temperature being within a temperature band or (ii) based on the difference being maintained for a time period in the second operation mode, the operations further comprise performing an operation to switch to the first operation mode, and
wherein the target set temperature is automatically set to a temperature that is determined by an external server based on big data in response to the current temperature.

16. The cloud server of claim 15, wherein, for each of the plurality of air conditioners, the at least one parameter comprises (i) an indoor initial temperature related to a time at which the first operation mode is started for the respective air conditioner, (ii), target set temperature for the first operation mode of the respective air conditioner, (iii) a temperature change rate during an initial time interval of the first operation mode of the respective air conditioner, (iv) a temperature change rate during the first operation mode of the respective air conditioner, and (v) a time difference between a start time and an end time of the first operation mode of the respective air conditioner.

17. The cloud server of claim 16, wherein the at least one machine-learning network comprises:
at least one input layer that has the at least one parameter as at least one input node;
at least one output layer that has the operation mode information as at least one output node; and
at least one hidden layer arranged between the at least one input layer and the at east one output layer,
wherein weights of at least one node and at least one edge of the at least one input node and the at least one output node are updated by a learning process of the at least one machine-learning network.

18. The cloud server of claim 15, wherein using at least one machine-learning network and generating the operation mode information further comprises:
inputting the received at least one parameter to the at least one machine-learning network that uses deep learning to calculate at least one result factor, the at least one result factor including information regarding an operation mode; and
generating the operation mode information based on the at least one result factor.

* * * * *